United States Patent
Ohashi et al.

(10) Patent No.: US 7,373,270 B2
(45) Date of Patent: May 13, 2008

(54) DIAGNOSING DEVICE FOR STEREO CAMERA MOUNTED ON ROBOT, AND DIAGNOSTIC METHOD OF STEREO CAMERA MOUNTED ON ROBOT APPARATUS

(75) Inventors: Takeshi Ohashi, Kanagawa (JP); Takayuki Yoshigahara, Tokyo (JP); Masaki Fukuchi, Tokyo (JP); Kenichi Hidai, Tokyo (JP)

(73) Assignee: Sony Corporation, Tokyo (JP)

( * ) Notice: Subject to any disclaimer, the term of this patent is extended or adjusted under 35 U.S.C. 154(b) by 49 days.

(21) Appl. No.: 10/808,947

(22) Filed: Mar. 25, 2004

(65) Prior Publication Data

US 2004/0233290 A1 Nov. 25, 2004

(30) Foreign Application Priority Data

Mar. 26, 2003 (JP) .............................. 2003-086621

(51) Int. Cl.
   *G01C 9/00* (2006.01)
(52) U.S. Cl. ...................................... 702/150; 356/605
(58) Field of Classification Search ................ 702/150; 318/568.12, 580; 324/758; 700/245, 259; 348/139, 159; 704/275; 356/605
   See application file for complete search history.

(56) References Cited

U.S. PATENT DOCUMENTS 5,311,286 A * 5/1994 Pike ............................ 356/605
5,384,431 A * 1/1995 Tusques .................. 174/117 F
5,684,531 A * 11/1997 Li et al. ..................... 348/139
6,535,793 B2 * 3/2003 Allard ........................ 700/259
6,841,963 B2 * 1/2005 Song et al. ............. 318/568.12
6,850,024 B2 * 2/2005 Peless et al. ................. 318/580
2003/0130851 A1 * 7/2003 Nakakita et al. ............ 704/275
2003/0210329 A1 * 11/2003 Aagaard et al. ............ 348/159
2004/0119487 A1 * 6/2004 Song et al. .................. 324/758
2004/0249504 A1 * 12/2004 Gutmann et al. ........... 700/245

* cited by examiner

*Primary Examiner*—John Barlow
*Assistant Examiner*—Xiuqin Sun
(74) *Attorney, Agent, or Firm*—Frommer Lawrence & Haug LLP; William S. Frommer; Thomas F. Presson

(57) ABSTRACT

A diagnostic mat has a texture, which enables avoiding mismatching in diagnosis and calibration, such as uniform and unduplicated patterns, for example, random dot patterns, fractal, natural images, and the like. A robot apparatus placed on the diagnostic mat assumes a stance suitable for taking images of the diagnostic mat, creates a distance image from an image acquired by the stereo camera, and verifies the performance of the stereo camera based on the flatness of the diagnostic mat obtained from this distance image. This assists in diagnosing the offset of the stereo camera mounted on the robot apparatus due to the deterioration over time of the stereo camera, falling of the robot apparatus, and the like.

7 Claims, 22 Drawing Sheets

FIG. 5
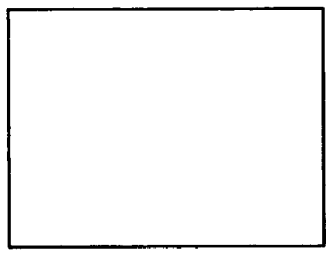
RANDOM DOT
FRACTAL
NATURE IMAGE
FIG. 6
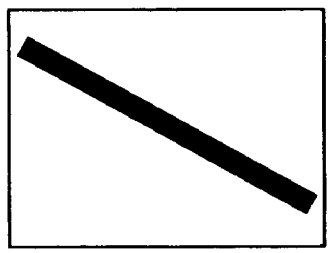
FIG. 7
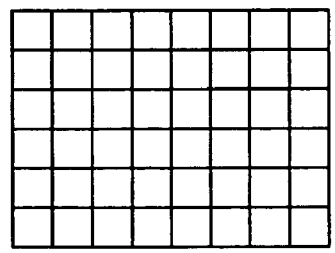
BINARY CHECKERED PATTERN FIG. 13
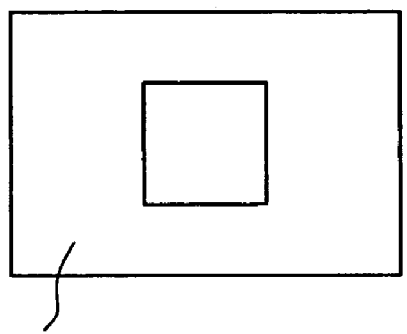
IMAGING IMAGE Ib
OF STANDARD CAMERA
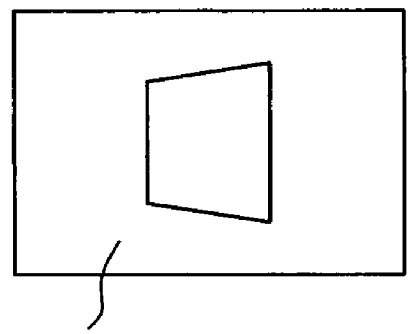
IMAGING IMAGE Id
OF REFERENCE CAMERA

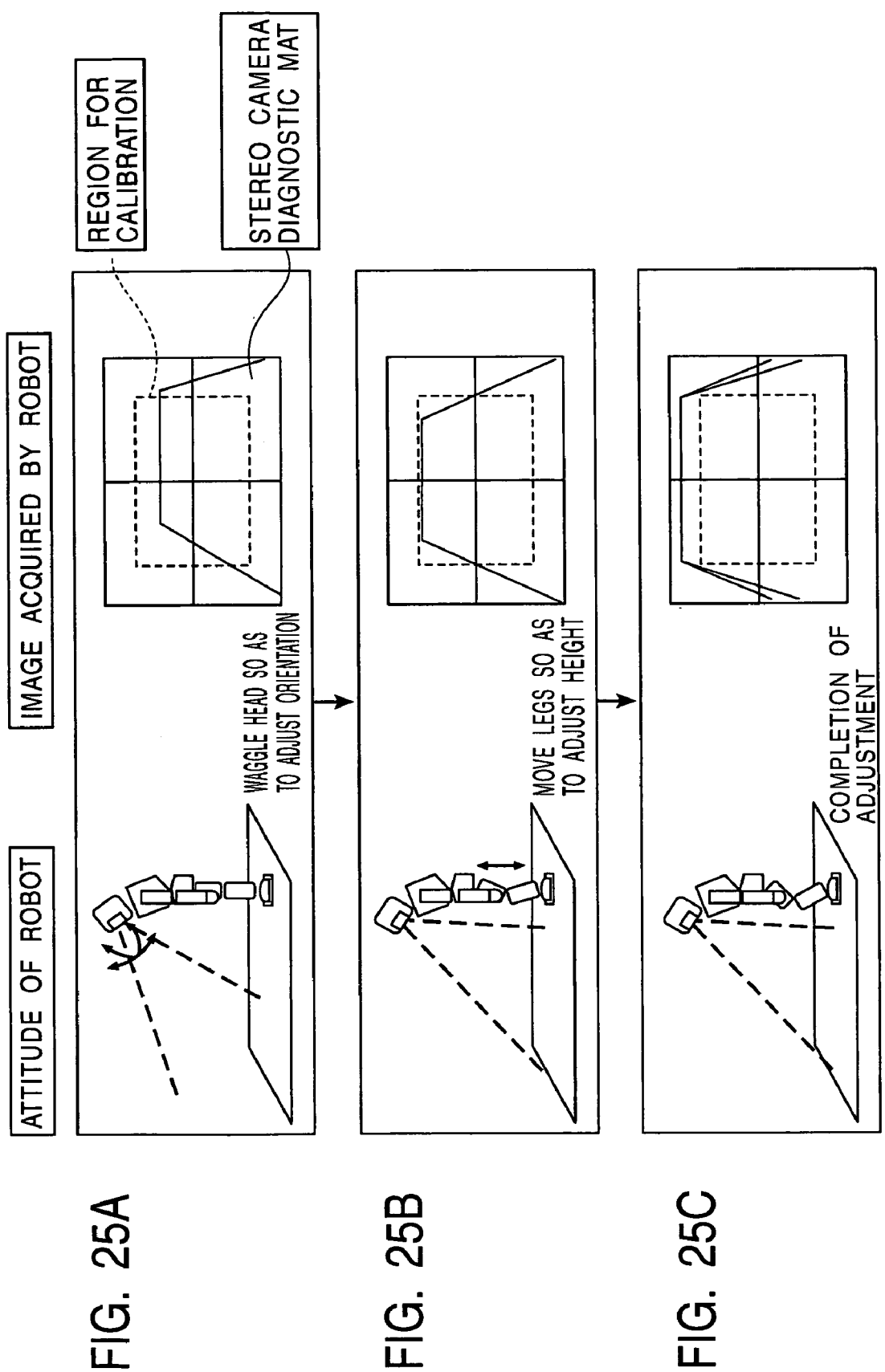

DIAGNOSING DEVICE FOR STEREO CAMERA MOUNTED ON ROBOT, AND DIAGNOSTIC METHOD OF STEREO CAMERA MOUNTED ON ROBOT APPARATUS

BACKGROUND OF THE INVENTION

1. Field of the Invention

The present invention relates to a stereo camera diagnosing device and a stereo camera diagnostic method, which are used at the time of diagnosing a stereo camera which measures the distance between each point within an image, and the projected center thereof, the image having been taken from multiple viewpoints having a predetermined positional relation, by the principle of triangulation. The present invention particularly relates to a stereo camera diagnosing device which assists diagnostic work for a stereo camera mounted on a robot, and a method for diagnosing a stereo camera mounted on a robot apparatus.

In further detail, the present invention relates to a stereo camera diagnosing device which assists diagnosing of positional offset of a stereo camera due to deterioration of the stereo camera over time, falling of the robot apparatus on which the camera is mounted, and to a method for diagnosing a stereo camera mounted on a robot apparatus, and in particular relates to a stereo camera diagnosing device which is used at the time of diagnosing a stereo camera using the automatic diagnostic function of an intelligent robot apparatus, and a method for diagnosing a stereo camera mounted on a robot apparatus.

2. Description of the Related Art

An apparatus for performing operations similar to human movement using electric or magnetic action is referred to as a "robot". It is said that the origin of the term "robot" is derived from the word "ROBOTA", which means a slave machine in Slavic. Recently, study and development regarding various types of ambulatory mobile robots including "human-type" or "humanoid" robots designed after the body mechanism or actions of the animals like human beings who perform bipedal ambulation in erect posture is progressing, and demand for practical application of robots is increasing.

Most working spaces and living spaces for human beings are formed so as to match the behavioral patterns of bipedal ambulation in the erect posture possessed by human beings. In other words, in the living spaces of human beings, there are many obstacles for current mechanical systems using wheels as transporting means to move. In order for robots to assist or stand in for human tasks, and further become commonplace in human living spaces, the mobile range of the robots will need to become almost the same as that of human beings. This is the reason why there are great expectations for practical implementation of ambulatory mobile robots.

Such a humanoid robot can be applied to various types of work in industrial activities and production activities on behalf of human beings. For example, human beings have humanoid robots engaged on behalf of themselves in dangerous and hard work at sites such as maintenance work in an atomic power plants, thermal power plants, and petrochemical plants, transport and assembly of parts in manufacturing facilities, cleaning in high-rise buildings, and rescue at fire sites or the like where humans cannot readily go.

Also, examples of other usage of humanoid robots include so-called "harmonious coexistence" or "entertainment", in which the robot shares a living space with human beings. With this type of usage, the robot is placed in the same work environment as human beings, such as in a family environment, and used in this environment. This case takes on the character of "living together" rather than performing tasks instead of humans.

Intelligent mobile robots perform autonomous thinking control and action control, and also execute autonomous actions in accordance with a time series model for generating actions. Moreover, the robots can expand autonomous actions and the working range, and realize realistic communication with human beings at a more intelligent level by being equipped with an image input device and audio input/output device, and performing environment recognition with image processing and audio processing (see Japanese Unexamined Patent Application Publication No. 2002-283261, for example).

For example, equipping a mobile robot with functions such as image input, image processing, and image recognition allows the robot to detect landmarks disposed at various places within a working environment so as to execute predetermined actions, thereby guiding the robot even in an state where no humans are present (see Japanese Unexamined Patent Application Publication No. 2002-149240 and Japanese Unexamined Patent Application Publication No. 2003-166824, for example).

Furthermore, mounting a stereo camera serving as an image input device on the robot allows the robot to precisely recognize the distance up to obstacles scattered through a working space, so as to avoid these obstacles, and to identify a floor face so as to recognize irregularities thereof, which can be utilized for correction of walking routes and control of attitude stability. A stereo camera is made up of multiple cameras (most commonly two cameras) each having different viewpoints (projected center) which are maintained at a predetermined positional relation, and measures the distance between each point within an image taken from multiple viewpoints and the projected center using the principle of triangulation.

Now, a bipedal ambulatory mobile robot comprises many link systems, including redundant degree-of-freedoms, whereby the robot can perform complex actions, and also simultaneously execute multiple tasks such as movement, maintenance of balance, and arm work. On the other hand, the robot has difficulty in maintaining attitude stability of itself, whereby it is assumed that the robot may fall down during walking or performing other tasks using the legs thereof.

For example, in the event that a stereo camera is mounted on the head of a robot, there is a problem wherein changing the relative position of the camera cannot correctly perform stereo distance measurement, even though the camera is not damaged. Furthermore, there is the possibility that deterioration over time may cause the relative position of the camera to change, even if falling or other impact is not applied to the camera.

Performing recalibration can recover the performance of a stereo camera, but requires special tools, and cannot be readily performed due to issues of the number of steps involved in recalibration, and the amount of time and technology involved.

Also, a method for easily performing calibration again using suitable corresponding points within images acquired by the left and right cameras and the like have been proposed, but there is a problem in terms of calibration accuracy.

SUMMARY OF THE INVENTION

Accordingly, it is an object of the present invention to provide an excellent stereo camera diagnosing device capable of assisting diagnostic work for diagnosing the positional offset of a camera and the like due to deterioration over time of a stereo camera mounted on a robot apparatus, falling of the robot apparatus, and the like, and a method for diagnosing a stereo camera mounted on a robot apparatus.

The present invention has been made in light of the above-described problems, and according to a first aspect of the present invention, a diagnosing device for a stereo camera mounted on a robot comprises a flat surface portion on which texture for stereo camera diagnosis is provided; and an indicator disposed on the surface portion for indicating positional relation between the robot and the surface portion.

Here, the robot preferably includes a ground-contact portion for contact with a floor face and the indicator preferably indicates a place on the surface portion where the ground-contact portion of the robot is placed. For example, in the event that the robot is a ambulatory mobile robot having one or more mobile legs including a foot, the indicator can realize the function by indicating a place on the surface portion where the soles of feet of the robot are to be placed. Of course, the portions to be disposed on the indicator are not restricted to the feet of the robot, rather, any portions can be placed thereupon such as hands or hip, as long as the portion can be placed on the indicator, can facilitate the visual line direction of the stereo camera to be determined thereby, or can facilitate the attitude of the robot to adjust the visual line direction of the stereo camera.

The stereo camera diagnosing device may have a folding structure, which becomes a flat shape exposing the surface portion at the time of unfolding the folding structure.

Here, the surface portion may include texture within a template, which can correctly perform matching on an epipolar line in the event of a stereo camera system using template matching. The texture is preferably a texture which allows avoiding mismatching such as uniform and unduplicated patterns like random dot patterns, fractal, natural images, or the like, in the diagnosis and calibration. Also, the surface portion may have patterns shaded in uniform texture, used for highly accurate stereo camera diagnosis. Further, the surface portion may include calibration patterns of which the geometrical shape is known.

Also, according to a second aspect of the present invention, a method for diagnosing a stereo camera mounted on a robot apparatus comprises a step for causing the robot apparatus placed on a diagnostic mat having predetermined texture to assume a stance suitable for taking an image of the diagnostic mat; a step for creating a distance image based on the image acquired by the stereo camera; a step for detecting the flat face of the diagnostic mat from the created distance image; and a step for measuring the flatness of the detected flat face, and verifying the performance of a stereo camera according to whether or not the flatness is greater than a standard flatness.

A distance image means an image made up of the respective pixel values which are obtained by calculating parallax data through image matching between an image taken by a standard camera and an image taken by a reference camera, and calculating the distance up to a subject which is copied to each pixel of the image taken by the standard camera based on the camera parameters obtained by the parallax data and camera calibration.

Here, in the event that the detected flatness of the flat face is greater than a standard flatness, the performance of a stereo camera is assumed to be sufficient, so determination can be made that calibration is unnecessary. On the other hand, in the event that the detected flatness is below the standard flatness, the performance of the stereo camera is assumed to be insufficient, so determination can be made that calibration is necessary.

In the step for verifying the performance of a stereo camera, the mathematical expression for the flat face making up the diagnostic mat based on the created distance image may be obtained, and determination may be made whether or not the flatness is greater than the standard flatness based on the deviation of the distance between each point on the diagnostic mat and the flatness.

Also, according to a third aspect of the present invention, a method for diagnosing a stereo camera mounted on a robot apparatus comprises a step for causing the robot apparatus placed on a diagnostic mat having predetermined texture to assume a stance suitable for taking an image of the diagnostic mat; a step for creating a distance image based on the image acquired by the stereo camera; a step for obtaining a transformation expression to a camera coordinates system on the basis of a floor coordinates system by solving the kinematics of joints of the robot apparatus, and obtaining the mathematical expression for the flat face of a floor face on the basis of the camera coordinates system and the transformation expression; and a step for comparing a distance value from the stereo camera with a flat face due to kinematics so as to diagnose the stereo camera.

Here, in the event that the detected flatness of the flat face is greater than the flatness of the camera coordinates system, the performance of a stereo camera is assumed to be sufficient, so determination can be made that calibration is unnecessary. On the other hand, in the event that the detected flatness is below the flatness of the camera coordinates system, the performance of a stereo camera is assumed to be insufficient, so determination can be made that calibration is necessary.

Also, according to a fourth aspect of the present invention, a method for diagnosing a stereo camera mounted on a robot apparatus comprises a step for causing the robot apparatus placed on a diagnostic mat shaded in uniform texture to assume a stance suitable for taking an image of the diagnostic mat; a step for creating a distance image based on the image acquired by the stereo camera; and a step for comparing a distance value around the shaded portion with a standard flat face so as to diagnose the stereo camera based of the difference between both.

In the event that the difference between the distance value and the standard flatness is a threshold value or less, the performance of a stereo camera is assumed to be sufficient, so determination can be made that calibration is unnecessary. On the other hand, in the event that the difference exceeds the threshold value, the performance of a stereo camera is assumed to be insufficient, so determination can be made that calibration is necessary.

Also, according to a fifth aspect of the present invention, a method for diagnosing a stereo camera mounted on a robot apparatus comprises a step for causing the robot apparatus placed on a diagnostic mat having texture including a predetermined template to assume a stance suitable for taking an image of the diagnostic mat; a step for acquiring a standard camera image and detected camera image using the stereo camera; a step for searching a template within the standard camera image along an epipolar line within the detected camera image, and obtaining a matching score representing a correlation value for each template along the epipolar line; and a step for determining the offset of the epipolar line based on the compared results between the matching score value and a standard value.

Here, in the event that the offset of the epipolar line is sufficiently small, the performance of a stereo camera is assumed to be sufficient, so determination can be made that calibration is unnecessary. On the other hand, in the event that the offset of the epipolar line is great, the performance of a stereo camera is assumed to be insufficient, so determination can be made that calibration is necessary.

Also, according to a sixth aspect of the present invention, a method for diagnosing a stereo camera mounted on a robot apparatus comprises a step for causing the robot apparatus placed on a diagnostic mat having texture including a predetermined template to assume a stance suitable for taking an image of the diagnostic mat; a step for acquiring images required for calibration in the stereo camera; and a step for calculating the calibration parameters of the stereo camera using the acquired multiple images.

Note that, with the method for diagnosing a stereo camera according to each of the second through sixth aspects, the step for making said robot apparatus to assume a stance suitable for taking an image of the diagnostic mat specifically comprises a step for searching for the visual line direction of the stereo camera such that said texture fits in the region to be diagnosed within an image taken by the stereo camera; and a step for adjusting the size of the region to be diagnosed within an image taken by the stereo camera such that the texture covers the size in the visual line direction of the stereo camera.

In the step for searching for the visual line direction of the stereo camera, for example, the visual line direction can be detected through an action such as waggling the head mounting the stereo camera. Also, in the step for adjusting the size of the region to be diagnosed, the size can be adjusted through an action such as adjusting the distance up to the diagnostic mat using the mobile legs of the robot, or zooming.

According to the present invention, an excellent stereo camera diagnosing device capable of assisting diagnostic work for diagnosing the offset of a stereo camera and the like due to deterioration over time of the stereo camera mounted on a robot apparatus, falling of the robot apparatus, and the like, and a method for diagnosing a stereo camera mounted on a robot apparatus, can be obtained.

Further objects, features, and advantages of the present invention will become more fully apparent from detailed description of the present invention by way of the later-described embodiments of the present invention and the attached drawings.

BRIEF DESCRIPTION OF THE DRAWINGS

FIG. 5 is a diagram illustrating texture example of the surface of the stereo camera diagnostic mat;

FIG. 6 is a diagram illustrating a texture example of the surface of the stereo camera diagnostic mat;

FIG. 7 is a diagram illustrating a texture example of the surface of the stereo camera diagnostic mat;

FIG. 13 is a diagram schematically illustrating a standard image and reference image in the event that a generally square pattern is taken by the standard camera and reference camera respectively;

FIG. 25 is a diagram illustrating the attitude of the robot apparatus at each step of the action procedures shown in FIG. 24, and images acquired by the stereo camera.

DESCRIPTION OF THE PREFERRED EMBODIMENTS

The following is a description of an embodiment of the present invention with reference to the drawings.

A. Configuration of Robot

Figure 1:
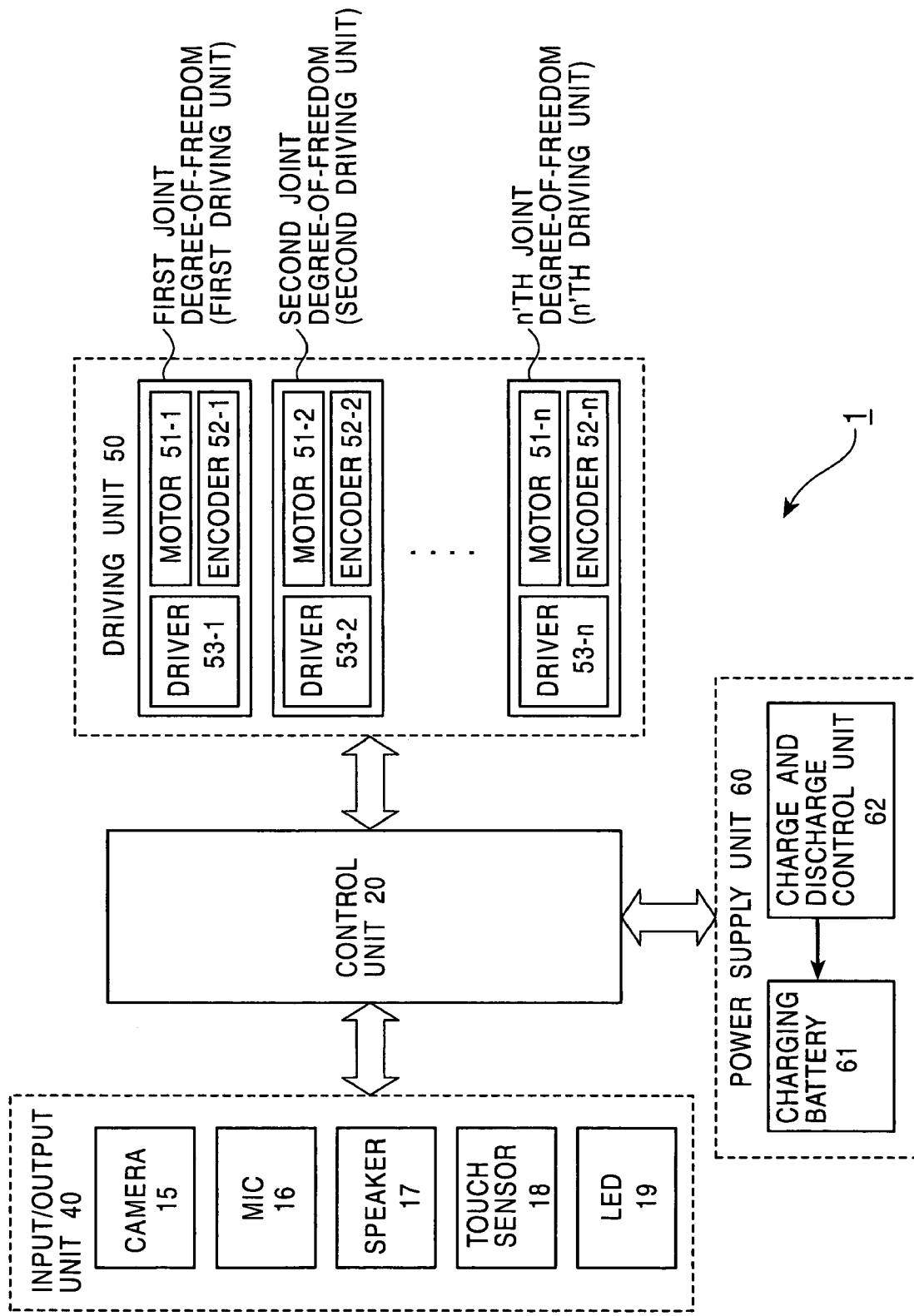
FIG. 1 is a diagram schematically illustrating the functional configuration of a robot apparatus 1 according to an embodiment of the present invention.

FIG. 1 schematically illustrates a functional configuration of a robot apparatus 1 employed in the embodiment of the present invention. As shown in the drawing, the robot apparatus 1 comprises a control unit 20 for performing overall control of the entire actions and other data processing, an input/output unit 40, a driving unit 50, and a power supply unit 60. The following is a description regarding each unit.

The input/output unit 40 includes, as an input unit, a camera 15 corresponding to the eyes of the robot apparatus 1, a microphone 16 corresponding to the ears, a touch sensor 18 disposed at a portion such as head, back, or the like for detecting contact with the user, and the other various types of sensors corresponding to the five senses. Moreover, the input/output unit 40 includes, as an output unit, a speaker 17 corresponding to the mouth, or an LED indicator (eye lamp) for forming the facial expressions by combination of blinking and timing of lighting and the like. These output units can express user feedback from the robot apparatus 1 in the other formats such as voice, blinking of lamps, and the like besides mechanical action patterns such as legs.

Here, the camera 15 makes up a stereo camera using two cameras each having a different viewpoint (projected center), which keep a predetermined positional relation, and measures the distance between each point within an image taken and the projected center using the principle of triangulation.

The driving unit 50 is a functional block for realizing the body action of the robot apparatus 1 in accordance with predetermined action patterns indicated by the control unit 20, which is a control target using behavior control. The driving unit 50 is a functional module for realizing flexibility in each joint of the robot apparatus 1, and comprises multiple driving units provided on each axis such as roll, pitch, yew, and the like in each joint. Each driving unit comprises the combination of a motor 51 for rotating around a predetermined axis, an encoder 52 for detecting the rotational position of the motor 51, and a driver 53 for controlling the rotational position and rotational speed of the motor 51 based on the output of the encoder 52 as necessary.

Changing the combination of the driving units allows the robot apparatus 1 to be configured as a ambulatory mobile robot, such as bipedal ambulation or quadruped ambulation robot, for example.

The power supply unit 60 is a functional module for performing power supply as to each electric circuit within the robot apparatus 1. The robot apparatus 1 according to the present embodiment is a autonomously-driven type using batteries, with the power supply unit 60 comprising a charging battery 61, and a charge and discharge control unit 62 for controlling the charging and discharging state of the charging battery 61. The charging battery 61 comprises a cartridge-type battery pack in which multiple lithium-ion secondary battery cells are packaged.

Also, the charge and discharge control unit 62 recognizes the remaining capacity of the battery 61 by measuring the terminal voltage, charge and discharge current, ambient temperature, and the like of the battery 61, and then determines the start and finish time of charging, and the like. The start and finish time of charging determined by the charge and discharge control unit 62 is notified to the control unit 20, which serves as a trigger for starting and finishing the charging operation of the robot apparatus 1.

The control unit 20 corresponds to the brain, and is mounted, for example, in the head or body of the robot apparatus 1.

Figure 2:
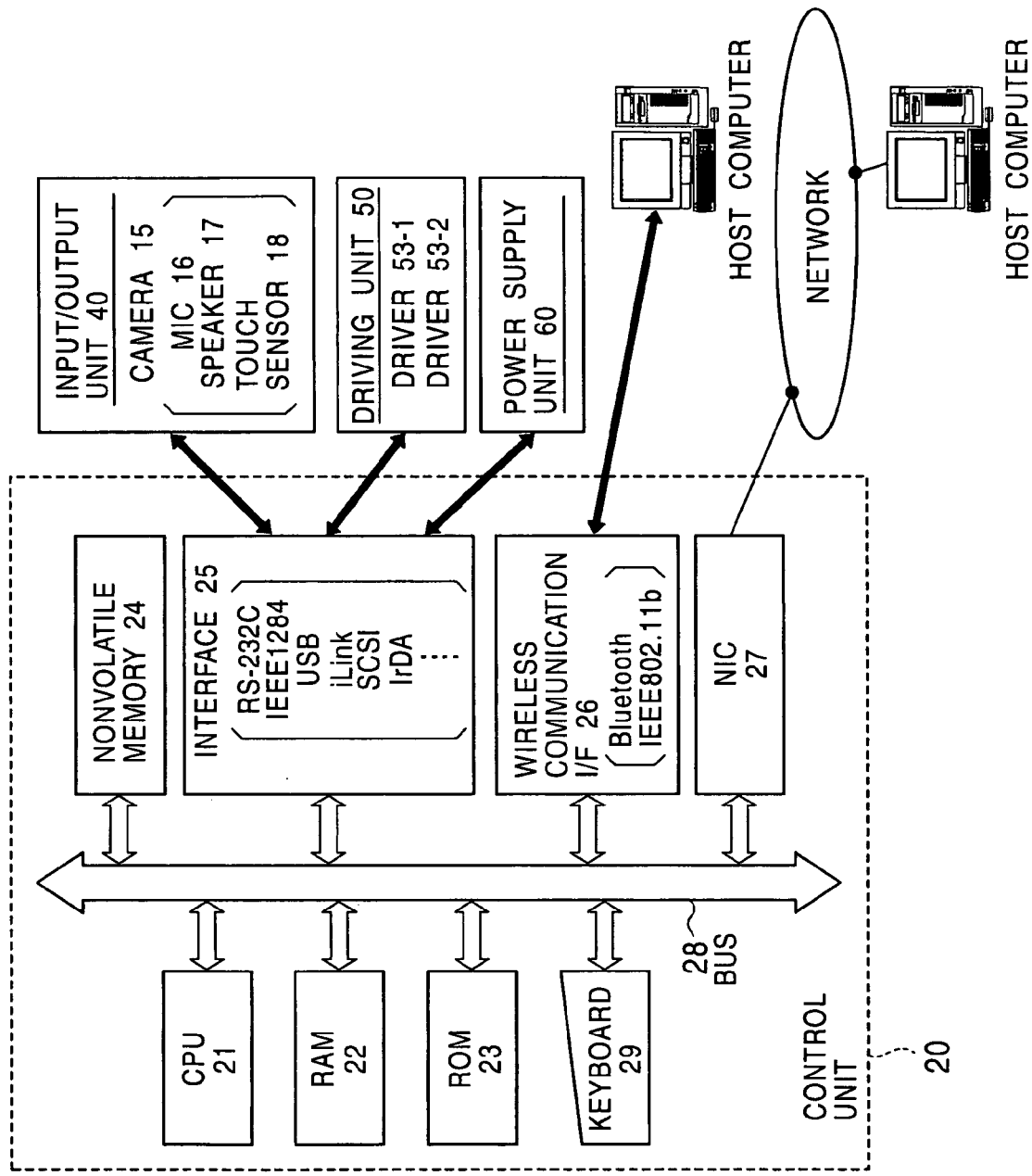
FIG. 2 is a diagram further illustrating the configuration of a control unit 20 in detail.

FIG. 2 illustrates the configuration of the control unit 20 in detail. As shown in the drawing, the control unit 20 has a configuration wherein a CPU (Central Processing Unit) 21 serving as a main controller is connected to memory, the other circuit components, peripheral devices through a bus. A bus 28 is a common signal transport path including data bus, address bus, control bus, and the like. A unique address (memory address or I/O address) is assigned to each device on the bus 28. The CPU 21 can communicate with a specific device on the bus 28 by specifying its address.

RAM (Random Access Memory) 22 is writable memory made up of volatile memory such as DRAM (Dynamic RAM), and is used for loading program code to be executed by the CPU 21, temporarily storing work data to be used by an executable program, and the like.

ROM (Read Only Memory) 23 is read-only memory for permanently storing programs and data. Examples of program codes to be stored to ROM 23 include a self-diagnostic test program to be executed at the time of turning on power, an action control program for stipulating the actions of the robot apparatus 1, and so forth.

The control program of the robot apparatus 1 includes a sensor input/recognition program for processing sensor input such as a stereo camera 15, a microphone 16, and the like so as to recognize the processed input data as a symbol, a behavior control program for controlling the behavior of the robot apparatus 1 based on sensor input and a predetermined behavior control model while keeping storing behavior such as short-term memory, long-term memory, and the like, a driving control program for controlling driving of each joint motor in accordance with a behavior control model, audio output of the speaker 17, and the like, a camera diagnostic/calibration program for performing the behavior of the robot so as to perform diagnosis and calibration of the stereo camera 15, and the like.

Non-volatile memory 24 comprises electrically erasable and writable memory elements such as EEPROM (Electrically Erasable and Programmable ROM), and is used for holding data to be sequentially updated in a non-volatile way. Examples of data to be sequentially updated include an encryption key, the other security information, a device control program to be installed after shipment, and the like.

An interface 25 is a device for mutually connecting to external equipment of the control unit 20 and enabling data exchange. The interface 25 performs, for example, data input/output between the camera 15, the microphone 16, and the speaker 17. Moreover, the interface 25 performs command input/output among each driver 53-1 to 53-n within the driving unit 50.

Furthermore, the interface 25 includes a general-purpose interface for connecting to peripheral equipment of a computer, such as an serial interface including RS (Recommended Standard)-232C and the like, a parallel interface including IEEE (Institute of Electrical and Electronics Engineers) 1284 and the like, USB (Universal Serial Bus) interface, i-Link (IEEE1394) interface, SCSI (Small Computer System Interface) interface, memory card interface (card slot) including memory sticks and PC cards, and the like, and an arrangement may be made wherein programs and data can be transferred among external devices locally connected. Furthermore, as another example, the interface 25 may be equipped with an infrared data communication (IrDA) interface to perform wireless communication with external devices.

Furthermore, the control unit 20 including a wireless communication interface 26, a network interface card (NIC) 27, and the like, can perform data communication with various types of external host computers through close-proximity wireless data communication such as Bluetooth, a wireless network such as IEEE 802.11b, or a wide area network such as the Internet.

Such data communication between the robot apparatus 1 and a host computer can calculate complex behavior control of the robot apparatus 1, and perform remote control using distant computer resources.

B. Diagnosis of Stereo Camera

The robot apparatus 1 according to the present embodiment precisely recognizes the distance up to obstacles scattered through a working space so as to avoid these obstacles based on distance measurement using the stereo camera 15, and identifies a floor face so as to recognize irregularities thereof, which can be utilized for correction of walking routes and control of stance stability.

On the other hand, the relative position of the two cameras changes due to impact or change over time, thereby leading to a problem that stereo distance measurement cannot be correctly performed. With the present embodiment, diagnosis of the stereo camera 15 which has deteriorated due to impact or change over time can be made automatically and easily. Moreover, in the event that deteriorated performance of the stereo camera 15 is recognized, the user can readily perform high-precision recalibration, thereby obtaining intrinsic performance of distance measurement thereof.

Figure 3:
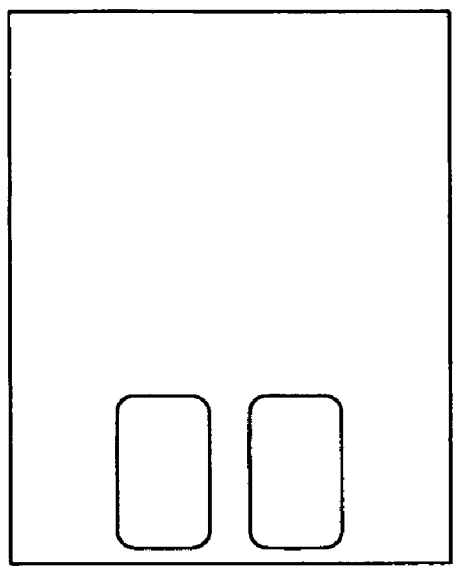
FIG. 3 is a diagram illustrating a configuration example of a stereo camera diagnostic mat.
Figure 4:
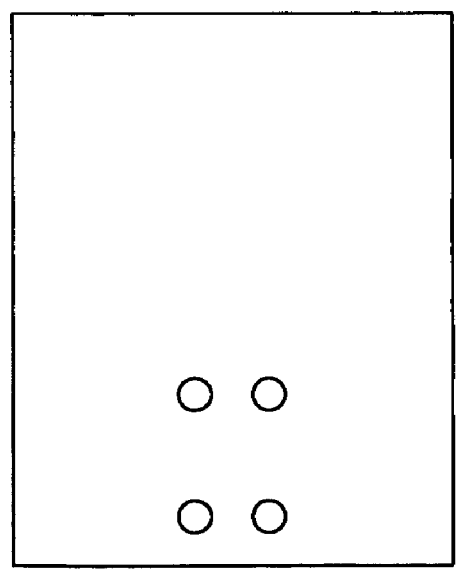
FIG. 4 is a diagram illustrating a configuration example of the stereo camera diagnostic mat.

FIG. 3 and FIG. 4 illustrate configuration examples of a stereo camera diagnostic mat. That in FIG. 3 is used for a bipedal ambulatory robot, and that in FIG. 4 is used for a quadruped ambulatory robot. On the surface of the mat, markings are made which indicate locations of stereo camera diagnostic texture and position to place the soles of the feet of the robot, to facilitate user by the user without mistake. Note that the portions to be placed on this mark are not restricted to the feet of the robot, rather, any portions can be placed thereupon, such as the hands or hip, as long as the portion can come into contact with the floor face. Even in the event that either ground-contact portion is placed on the mark, facilitating the visual line direction of the stereo camera to be determined thereby, or facilitating the stance of the robot to adjust the visual line direction of the stereo camera, is preferable.

The texture of the surface of the mat preferably facilitates the stereo camera 15 to perform distance measurement. For example, in the event of a stereo camera system using template matching, the texture within the template should allow for correct matching on an epipolar line, as described later.

FIGS. 5 through 7 illustrate texture examples of the surface of the stereo camera diagnostic mat. In the event of a common stereo camera system using template matching, a texture is preferable which avoids mismatching in diagnosis and calibration. The term "mismatching" here means mistaking of left and right camera images at the time of performing texture mapping for stereo distance measurement.

For example, texture examples include uniform and unduplicated patterns, which can avoid mismatching in diagnosis and calibration, such as random dot patterns, fractal, natural images, and the like, as shown in FIG. 5. Moreover, as shown in FIG. 6, a pattern shaded in uniform texture can be used for diagnosing a high-precision stereo camera.

On the other hand, the shape, size, and color of the calibration pattern is not restricted to any particular one, as long as a calibration pattern of which the geometrical shape is known. A combination of simple basic graphics is sufficient as long as the combination facilitates later-described creation processing within the computer. The calibration pattern may be a black-and-white checkerboard pattern or a combination of black-and-white triangles.

Figure 8:
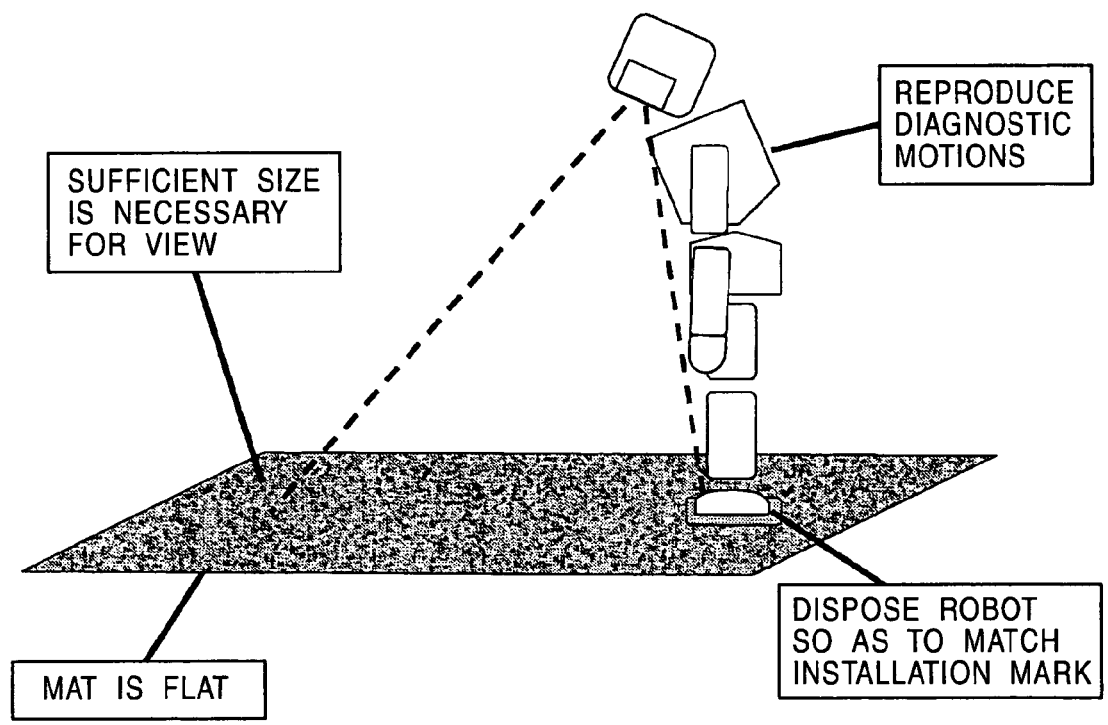
FIG. 8 is a diagram illustrating the usage of the stereo camera diagnostic mat.

FIG. 8 illustrates the usage of the stereo camera diagnostic mat. The robot is placed on the mat so as to fit on the installation marks, and then diagnostic motion is reproduced. The flatness of the mat is used for diagnosis and calibration of the stereo camera 15, so in the event that the diagnostic mat is a folding type, the mat needs to have a flat face when unfolded. Moreover, the flat face needs a sufficient size to acquire data required for diagnosis and calibration, though it is not necessary for the size to cover the entire field of view.

The term "sufficient size" here means to take a picture of the calibration pattern on the mat in a size sufficient to cover the region to be calibrated of a camera image. The robot apparatus takes a stance suitable for taking a picture of the diagnostic mat by autonomous actions for example. In this case, first, the visual line direction of the stereo camera is searched while waggling the head of the robot apparatus such that texture fits in the region to be diagnosed within the image taken by the stereo camera. Next, the size in the found visual line direction is adjusted by moving the location of the robot apparatus on foot, performing zooming, or the like, such that texture covers the region to be diagnosed within the image taken by the stereo camera.

B-1. Diagnostic Method by Detection of Flat Face

Figure 9:
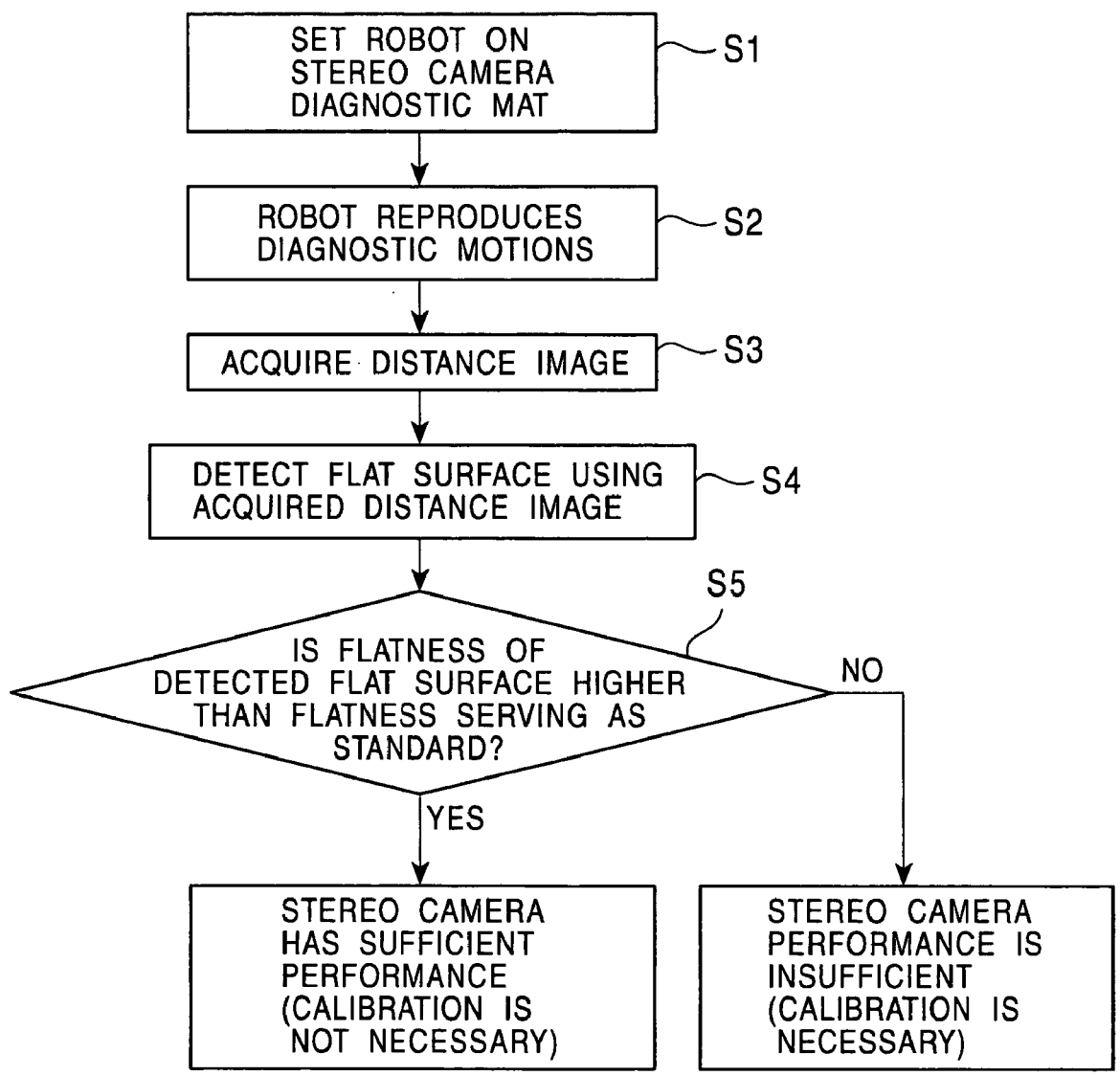
FIG. 9 is a diagram illustrating a diagnostic method for diagnosing a stereo camera by detecting a flat face.

FIG. 9 illustrates the procedures for diagnosing a stereo camera using detection of a flat face in a flowchart format. The robot is placed on the diagnostic mat (Step S1), and then upon a predetermined command being input, the robot reproduces diagnostic motion (Step S2). The robot takes a stance suitable for taking a picture of the diagnostic mat by this motion.

The term "stance suitable for taking a picture of the diagnostic mat" here means a sufficient size to get data required for diagnosis and calibration, that is to say, a stance to take a picture of the calibration pattern on the mat in a size sufficient to cover the region to be calibrated of a camera image. The motion operation for searching for this suitable stance will be described later in detail.

In this state, an image is acquired from the stereo camera 15, and then a distance image is created (Step S3).

The term "distance image" here means an image made up of the respective pixel values which are obtained by calculating parallax data through image matching between an image taken by a standard camera and an image taken by a reference camera, and calculating the distance up to a subject which is copied to each pixel of the image taken by the standard camera based on the camera parameters obtained by the parallax data and camera calibration. For example, applying a grayscale value corresponding to the distance between each point within a taken image and the projected center to each pixel forms a distance image.

Next, a flat face of the diagnostic mat is detected from the created distance image (Step S4).

Subsequently, the flatness of the detected flat face is measured, and then determination is made whether or not the detected flatness is at least a standard flatness (Step S5).

In the event that the detected flatness of the flat face meets at least the standard flatness, the performance of the stereo camera 15 is assumed to be sufficient, so determination is made that calibration is unnecessary. On the other hand, in the event that the detected flatness of the flat face is below the standard flatness, the performance of the stereo camera 15 is assumed to be insufficient, so determination is made that calibration is necessary.

Now, a specific method for determining flatness using a threshold value, which is executed in Step S5, will be described.

Figure 22A:
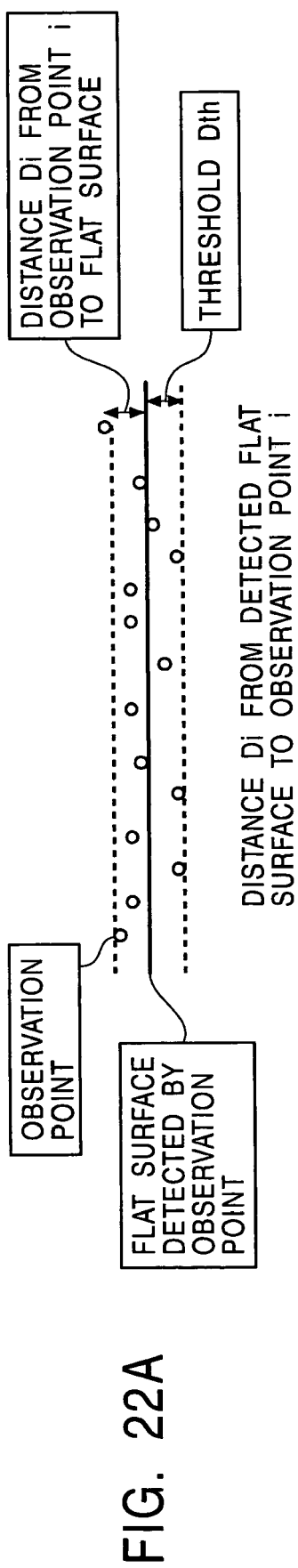
FIGS. 22A through 22C are diagrams describing the principle of the method for diagnosing the stereo camera by detecting a flat face.
Figure 22B:
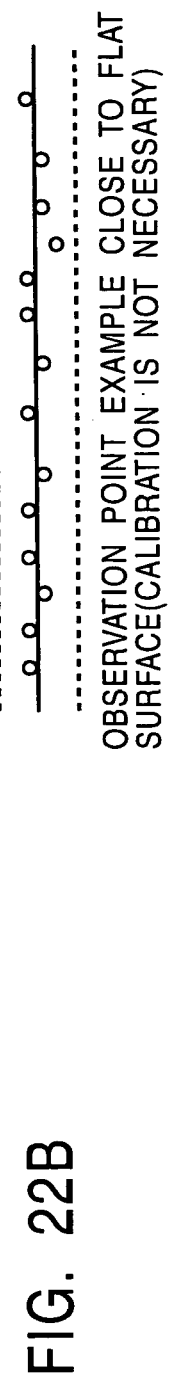
Figure 22C:
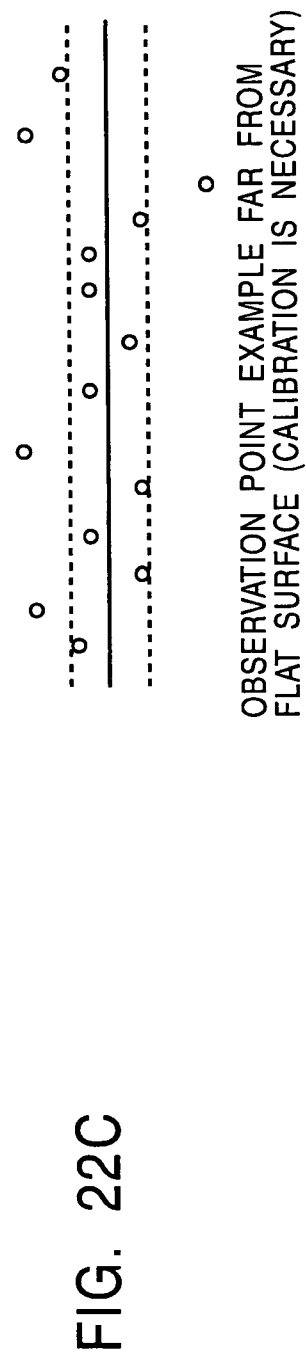

First, there is a method for determining a distance value from a flat face using a threshold value. This method has a principle wherein multiple observation points are provided on the flat face to be determined, distances from the center of the camera to respective observation points are obtained, the flat face is presumed from these distances, and then determination is made whether or not the presumed flat face is valid based on this presumed flat face and the deviation of the distances of the observation points. Calibration is unnecessary in the event that there are many observation points exhibiting values close to the presumed flat face, on the other hand, calibration is necessary in the event that there are many observation points exhibiting values far removed from the presumed flat face (see FIGS. 22A through 22C).

This determination method is processed in accordance with the following procedures.

(1) Let us say that the three-dimensional coordinates of the diagnostic mat to be measured by the stereo camera are $X_i$: ($x_i$, $y_i$, $z_i$). Here, i denotes each pixel point number within a distance image. The equation of a flat face to be detected using these three-dimensional coordinates is represented by the following expression.

$$n \cdot x + d = 0 \quad \text{[Expression 1]}$$

In the above expression, n represents the normal vector of the flat face, and x represents the coordinates of the flat face. Here, upon substitutions n=(a, b, c) and x=(x, y, z) being made, the above expression can be represented as a common two-dimensional equation, that is, ax+by+cz+d=0.

Figure 23:
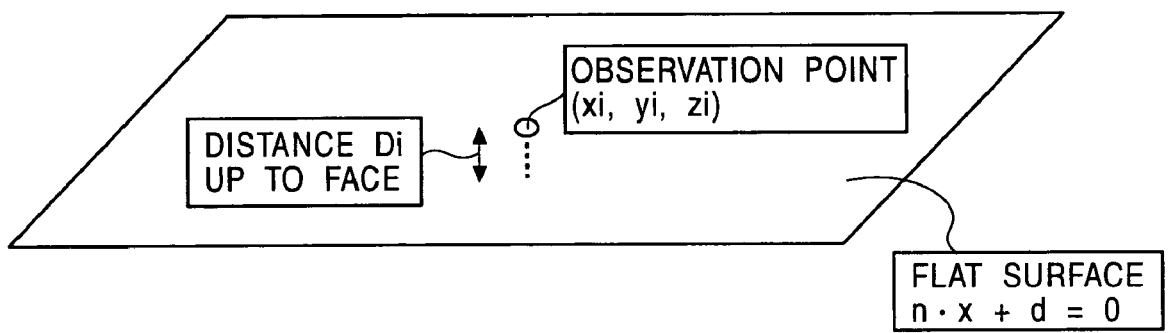
FIG. 23 is a diagram illustrating a distance $D_i$ between a flat face and i'th observation point $X_i$ ($x_i$, $y_i$, $z_i$)

The distance $D_i$ between this flat face and the i'th observation point $X_i$ ($x_i$, $y_i$, $z_i$) is calculated using the following expression (see FIG. 23).

[Expression 2]

$$D_i = \frac{|n \cdot x_i + d|}{|n|}$$

(2) The number of points $N_{over}$ satisfying a standard distance $D_{th} < D_i$ is counted by comparing $D_{th}$ with $D_i$.
(3) In the event that $N_{over} < N_{th}$ as a result of comparing the standard number $N_{th}$ with $N_{over}$, determination is made that the flatness of the flat face is great, and on the other hand, determination is made that the flatness is small if $N_{th} < N_{over}$.

Moreover, a method for determining a dispersion value corresponding to the distance value from the flat face using a threshold value is employed. In this case, the following procedures are employed.

(1) The distance $D_i$ from the detected flat face in each point i within the distance image is calculated using the above Expression 2.
(2) A dispersion value $V_D$ corresponding to the distance from the flat face is obtained from all $D_i$.

[Expression 3]

$$V_D = \frac{1}{N} \sum_{i=1}^{N} (D_i - \overline{D})^2$$

wherein $D_i$ represents the distance of the i'th pixel from the flat face, $\overline{D}$ represents the average distance of all pixels from the flat face, and N represents the number of pixels.

(3) In the event of comparing the dispersion value $V_D$ with a standard dispersion value $V_{th}$, determination is made that the flatness of the flat face is great if $V_D < V_{th}$, on the other hand, determination is made that the flatness is small if $V_{th} < V_D$.

Figure 10:
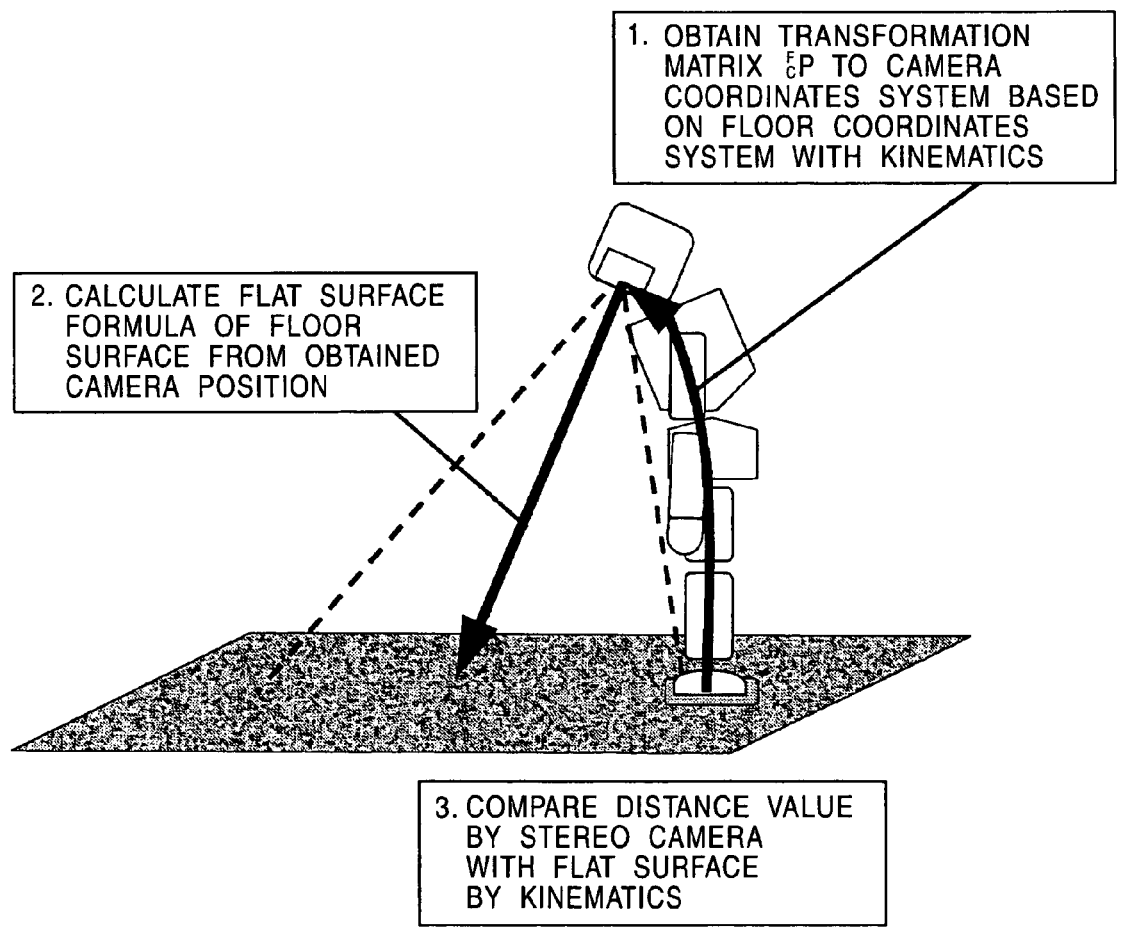
FIG. 10 is a diagram describing the principle of a method for comparing a flat face obtained by solving kinematics with a distance value obtained by the stereo camera.

B-2. Diagnostic Method by Comparison with Flat Face Obtained by Solving Kinematics FIG. 10 illustrates the principle of a method for comparing a flat face obtained by solving kinematics with a distance value by the stereo camera.

A conversion matrix to the camera coordinates system on the basis of the floor coordinates system can be obtained by solving kinematics regarding the joints of a robot. An equation regarding the flat face of a floor face on the basis of the camera coordinates system can be obtained through this conversion matrix. Accordingly, comparing a distance value obtained by the stereo camera and a flat face obtained by kinematics can diagnose a stereo camera.

Figure 11:
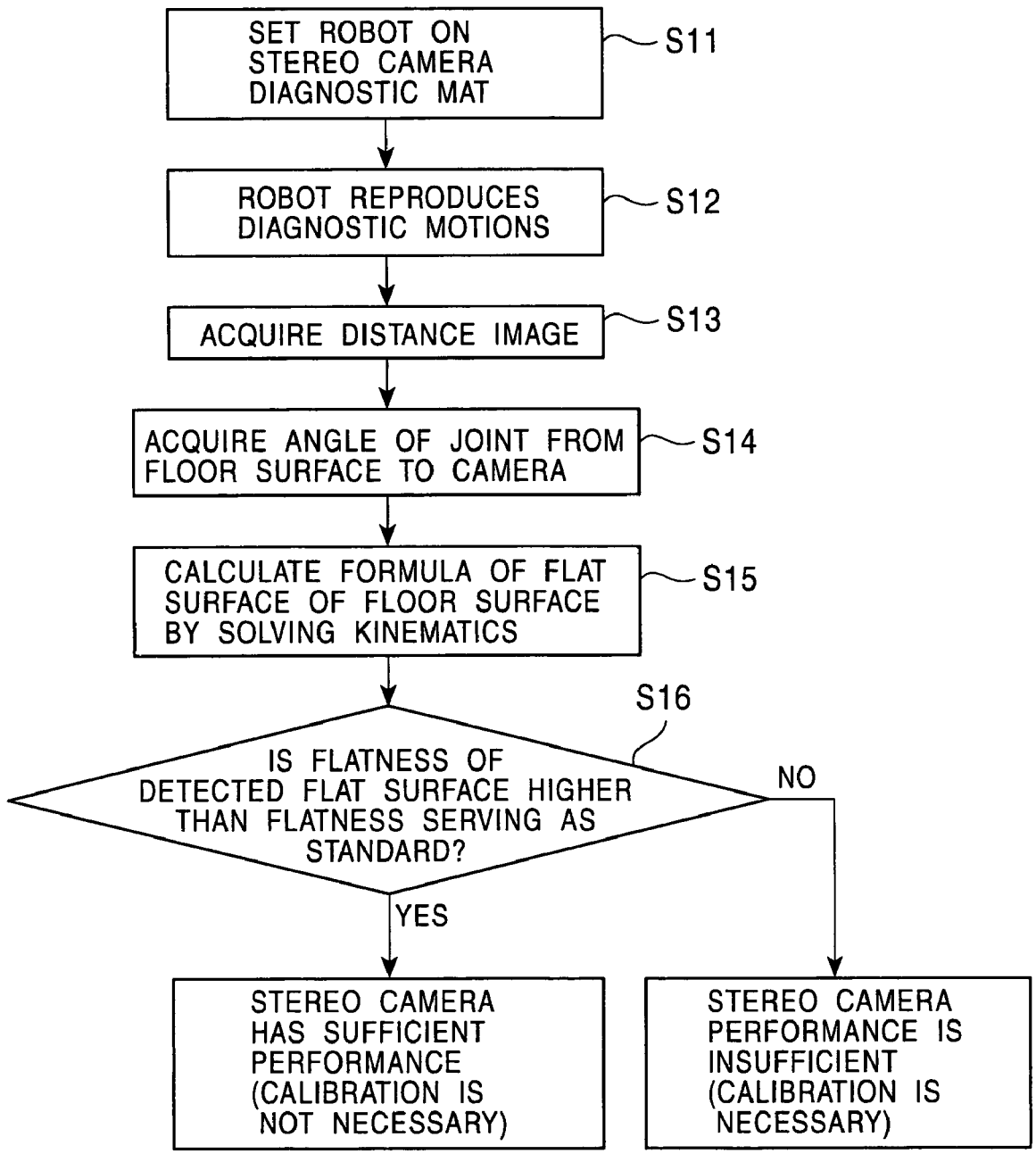
FIG. 11 is a flowchart illustrating the diagnostic procedures of the stereo camera for comparing a flat face obtained by solving kinematics with a distance value obtained by the stereo camera.

FIG. 11 illustrates the procedures for diagnosing a stereo camera by comparing the flat face obtained by solving kinematics with the distance value obtained by the stereo camera in a flowchart format.

The robot is placed on the diagnostic mat (Step S11), and then upon a predetermined command being input, the robot reproduces diagnostic motion (Step S12). The robot takes a stance suitable for taking a picture of the diagnostic mat by this motion.

The term "stance suitable for taking a picture of the diagnostic mat" here means a sufficient size to get data required for diagnosis and calibration, that is to say, a stance to take a picture of the calibration pattern on the mat in a size sufficient to cover the region to be calibrated of a camera image. Operation for motion for searching for this suitable stance will be described later in detail.

In this state, an image is acquired from the stereo camera 15, and then a distance image is created (Step S13). The distance image is created by applying a grayscale value corresponding to the distance between each point within a taken image and the projected center to each pixel as described above.

Next, the angles of the joints of the robot from the floor face to the camera are acquired (Step S14), a conversion matrix to the camera coordinates system on the basis of the floor coordinates system is obtained by solving kinematics regarding the joints of the robot, and then an equation of the flat face of the floor face on the basis of the camera coordinates system is obtained through this conversion matrix (Step S15).

Subsequently, the flatness of the obtained flat face from the distance image is measured, and the stereo camera is diagnosed by comparing the distance value obtained by the stereo camera and the flat face obtained by kinematics (Step S16).

In the event that the detected flatness of the flat face is greater than the standard flatness of the camera coordinates system, the performance of the stereo camera 15 is assumed to be sufficient, so determination is made that calibration is unnecessary. On the other hand, in the event that the detected flatness of the flat face is below the standard flatness, the performance of the stereo camera 15 is assumed to be insufficient, so determination is made that calibration is necessary.

Note that the method for comparison and determination regarding the flatness of the flat face is the same as described above.

Now, description will be made regarding how to obtain a two-dimensional equation of the floor face on the basis of the camera coordinates system.

Homogeneous coordinates system expression of an arbitrary point in the camera coordinates system is converted to a point on the basis of the floor coordinates system as shown in the following expression using the conversion matrix to the camera coordinates system on the basis of the floor coordinates system.

$$^F X = {_C^F} P \cdot {^C X} \qquad \text{[Expression 4]}$$

wherein $^C X$ denotes the homogeneous coordinates system expression of an arbitrary point in the camera coordinates system, ${_C^F} P$ denotes the conversion matrix to the camera coordinates system on the basis of the floor coordinates system, and $^F X$ denotes a point on the basis of the floor coordinates system using ${_C^F} P$.

On the other hand, an equation of the floor face in the floor coordinates system can be represented as in the following expression.

$$N \cdot {^F X} = 0 \quad N = (0, 0, 10) \qquad \text{[Expression 5]}$$

The above Expression 4 is substituted into this expression so as to obtain the following expression.

$$N' \cdot ({_C^F} P \cdot {^C X}) = 0 \qquad \text{[Expression 6]}$$

Now, N' is as follows.

$$N' = ({_C^F} P_{31}, {_C^F} P_{32}, {_C^F} P_{33}, {_C^F} P_{34}) \qquad \text{[Expression 7]}$$

Thus, the following expression is derived, and the two-dimensional equation of the floor face on the basis of the camera coordinates system is expressed as Expression 7.

$$N' \cdot {^C X} = 0 \qquad \text{[Expression 8]}$$

Employing the two-dimensional equation Expression 7 of the floor face obtained by this method instead of the detected flat face described in B-1 item enables a stereo camera to be diagnosed.

B-3. Diagnostic Method Using Diagnostic Mat Shaded in Uniform Texture

Figure 12:
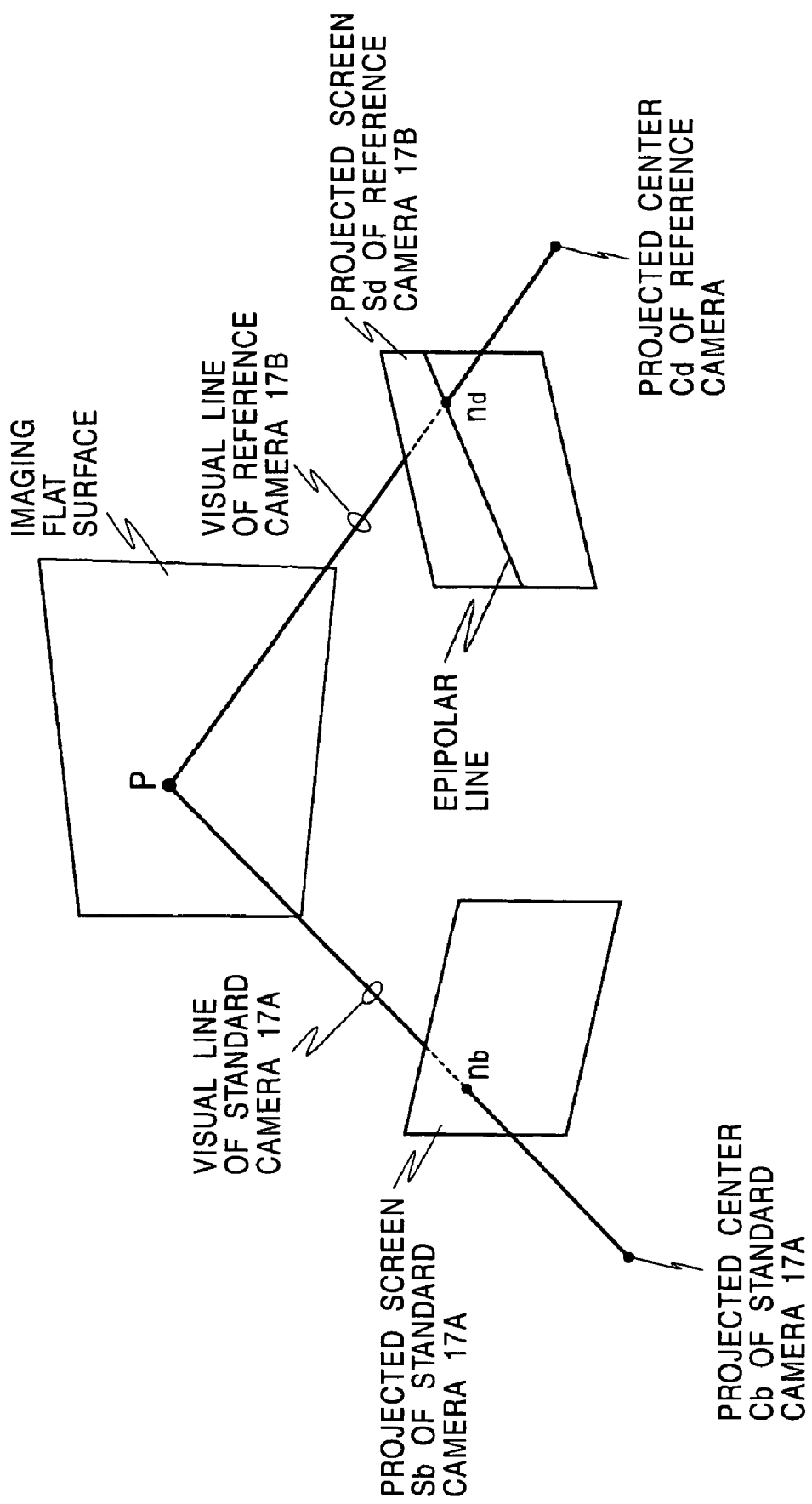
FIG. 12 is a diagram schematically illustrating the locations of a standard camera and reference camera as to an imaging subject.

Now, the basic mechanism of a stereo method will be described. In the event that the stereo camera 15 is made up of two cameras, one camera is used as a standard camera for taking a picture of a subject from the position facing front of the subject, so as to output a standard image. On the other hand, the other camera is used as a reference camera for taking a picture of a subject from a diagonal direction, so as to output a reference image. FIG. 12 schematically illustrates locations of the standard camera and reference camera facing a subject to be taken. Also, FIG. 13 schematically illustrates a standard image taken by the standard camera and a reference image taken by the reference camera in the event that a generally square pattern is taken by the standard camera and reference camera.

As shown in FIG. 13, the image taken by the standard camera facing the generally square pattern becomes a square. On the other hand, the image taken by the reference camera from the diagonal direction of the subject appears as a trapezoid as a result of the side of the square far from the viewpoint being reduced. This is based on the basic feature of center projection, that is, the closer a subject is to the a projected center C of the camera, the larger the size of an image to be projected is, on the other hand, the farther this subject is from the projected center C of the camera, the smaller the size of the image to be projected is.

Also, a visual line of the standard camera appears as a straight line referred to as an "epipolar line" on a projected screen $S_d$ of the reference camera (see FIG. 12). A point P on the visual line of the standard camera appears on the same observation point $n_b$ on a projected screen $S_b$ of the standard camera regardless of the depth of the point P, i.e., the distance up to the standard camera. On the other hand, an observation point $n_d$ of the point P on the projected screen $S_d$ of the reference camera appears at the position corresponding to the distance between the standard camera and the observation point P on the epipolar line.

Figure 14:
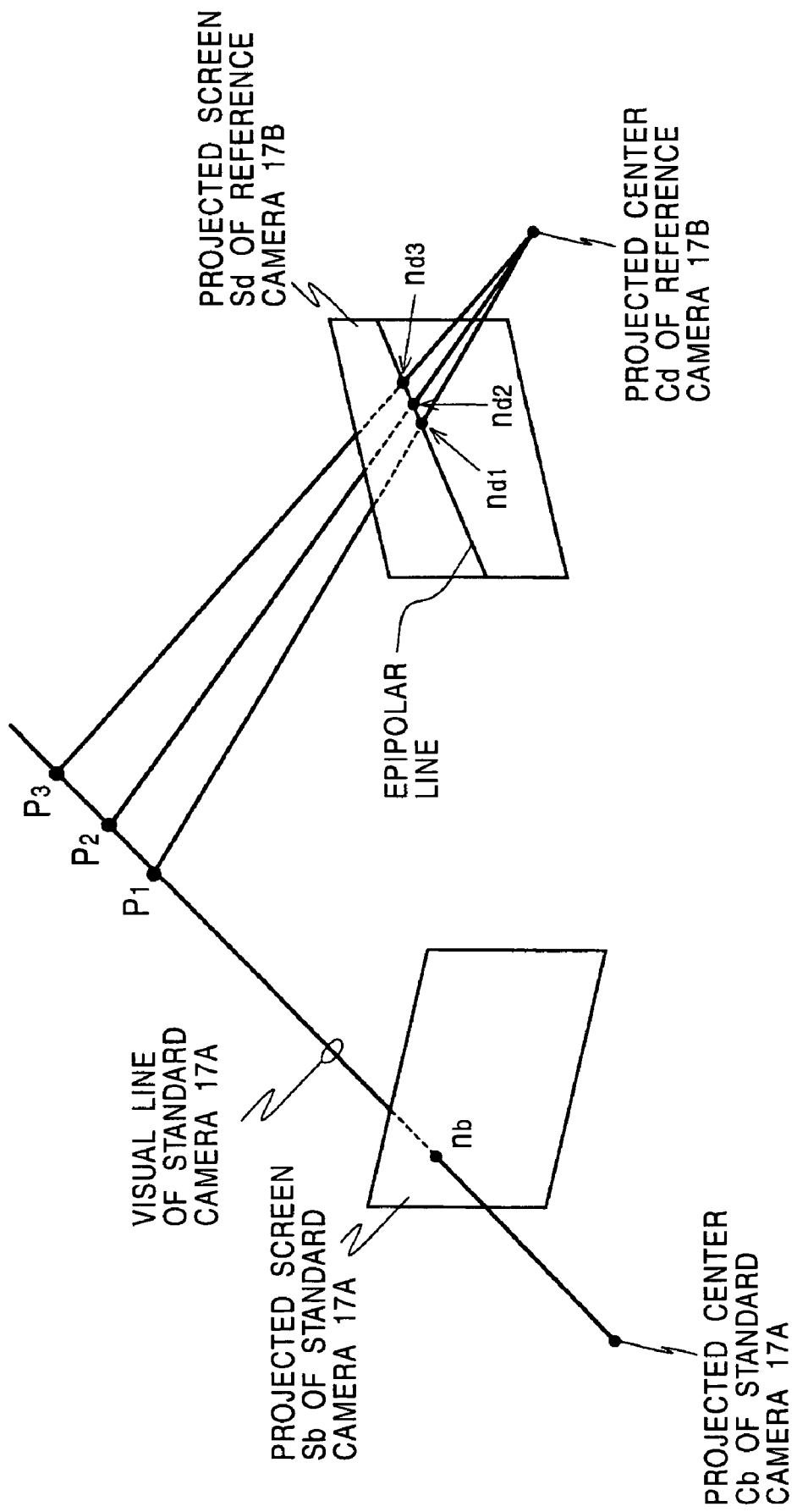
FIG. 14 is a diagram illustrating the relation of an epipolar line, observation points $n_{d1}$ through $n_{d3}$ on a projected screen $S_d$ of the reference camera.

FIG. 14 illustrates the epipolar line and the observation point $n_d$ on the projected screen $S_d$ of the reference camera. As shown in the drawing, as the position of the point P changes from $P_1$ to $P_2$, and then to $P_3$, the corresponding observation point within the reference image is shifted from $n_{d1}$ to $n_{d2}$, and then to $n_{d3}$. In other words, the position of the epipolar line corresponds to the depth of the point P. Searching the observation point $n_d$ corresponding to the observation point $n_b$ of the standard camera with the epipolar line, utilizing geometric optics, identifies the distance of the observation point P. This is the basic principle of the "stereo method".

Figure 15:
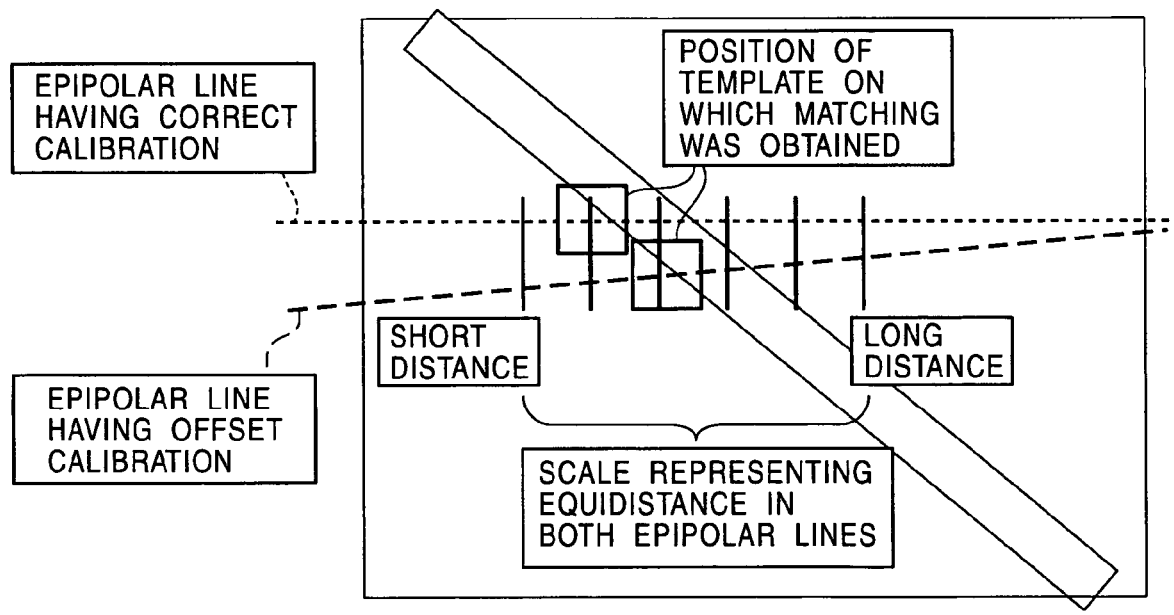
FIG. 15 is a diagram describing a diagnostic method using a diagnostic mat shaded in uniform texture.

Now, let us say that a stereo camera is diagnosed by template matching using a diagnostic mat shaded in uniform texture as shown in FIG. 6. Upon distance measurement being performed using the stereo camera of which position has come to be offset due to change over time, as shown in FIG. 15, the distance is observed closer to the correct epipolar line or far from the correct epipolar line (measured as a long distance in the drawing).

Using this property allows a stereo camera to be more precisely diagnosed since minute offset of the epipolar line can be measured as the difference of a measured distance.

Figure 16:
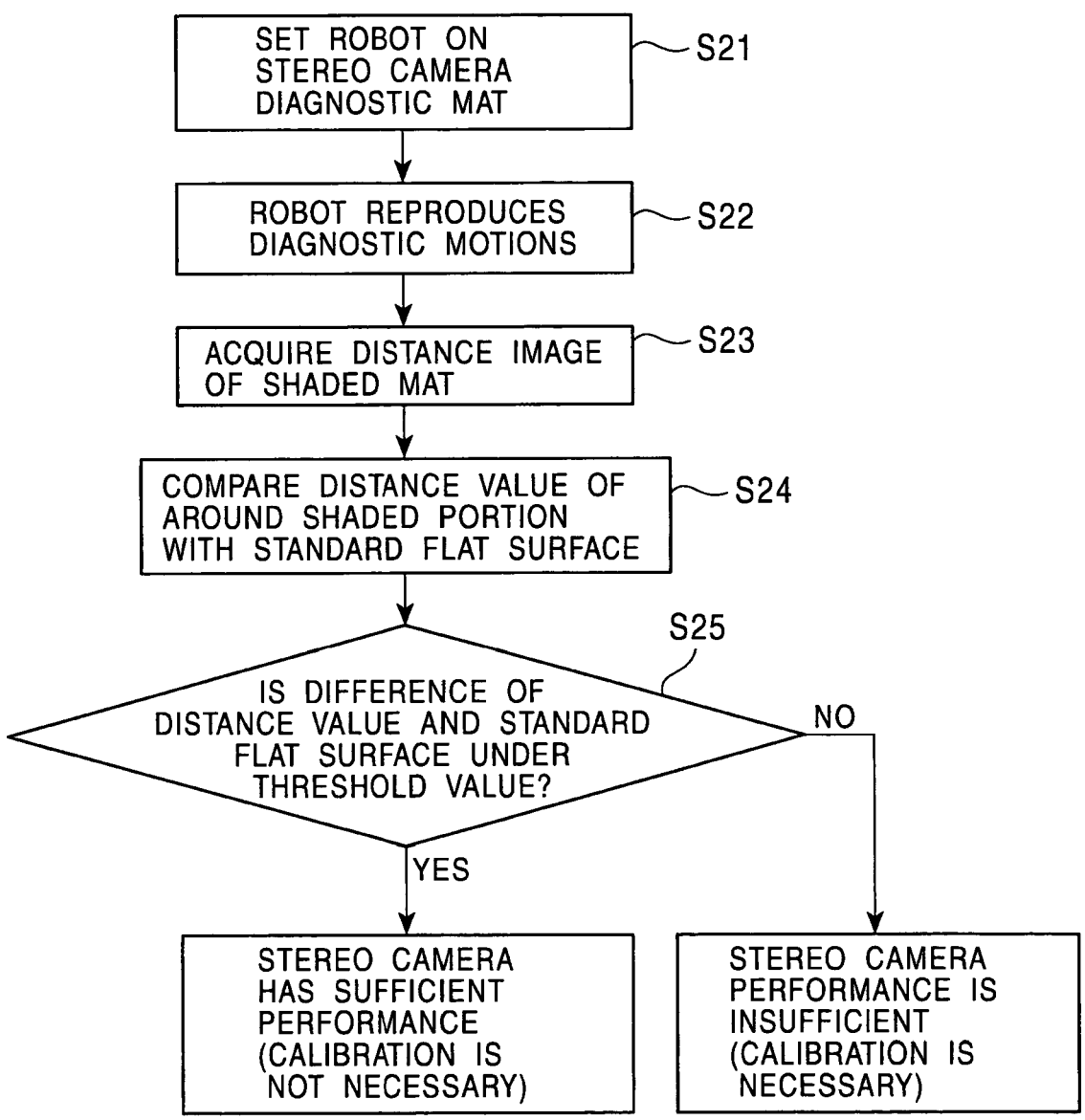
FIG. 16 is a flowchart illustrating the diagnostic procedures of the stereo camera using the diagnostic mat shaded in uniform texture.

FIG. 16 illustrates the procedures for diagnosing a stereo camera using a diagnostic mat shaded in uniform texture in a flowchart format.

The robot is placed on the diagnostic mat shown in FIG. 6 (Step S21), and then upon a predetermined command being input, the robot reproduces diagnostic motion (Step S22). The robot takes a stance suitable for taking a picture of the diagnostic mat by this motion.

The term "stance suitable for taking a picture of the diagnostic mat" here means a sufficient size to get data required for diagnosis and calibration, that is to say, a stance to take a picture of the calibration pattern on the mat in a size sufficient to cover the region to be calibrated of a camera image. Operations for searching for this suitable stance will be described later in detail.

In this state, an image is acquired from the stereo camera 15, and then a distance image is created (Step S23). The distance image is created by applying a grayscale value corresponding to the distance between each point within a taken image and the projected center to each pixel.

Next, a distance value around the shaded portion is compared with a standard flat face (Step S24). The term "standard flat face" here means, for example, the flat face obtained by the processing described in Section B-1 or Section B-2 above.

In the event that the difference between the distance value and the standard flat face is within a threshold value, the performance of the stereo camera 15 is assumed to be sufficient, so determination is made that calibration is unnecessary. On the other hand, in the event that the difference exceeds the threshold value, the performance of the stereo camera 15 is assumed to be insufficient, so determination is made that calibration is necessary (Step S25).

B-4. Method for Diagnosing Stereo Camera from Matching Score Value

Figure 17:
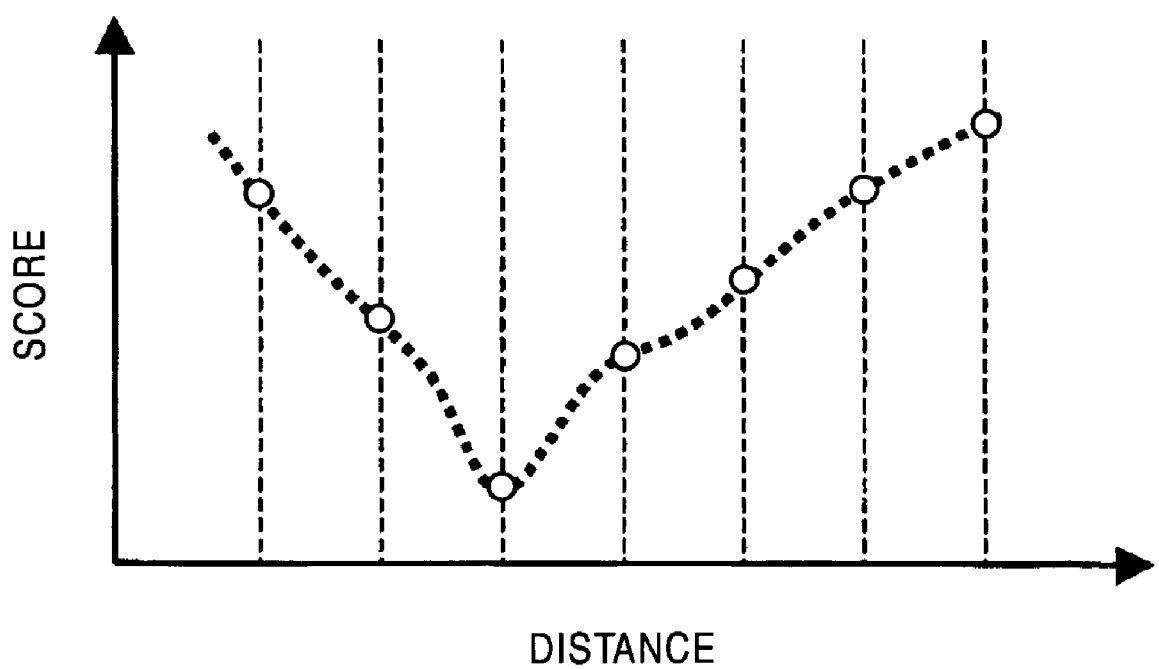
FIG. 17 is a diagram illustrating an example of matching scores.

In the event of a stereo camera using a template matching method, as shown in FIG. 14, a template within a standard camera image is searched along an epipolar line within a detected camera image. At this time, a matching score representing a correlated value as to each template can be obtained along the epipolar line. FIG. 17 is a chart illustrating the sum of luminance difference as an example of matching scores. The example shown in the drawing illustrates that the lower a score value is, the higher correlation is.

In the event of the positional offset between stereo cameras due to impact, change over time, and the like, correct matching cannot be obtained on the epipolar line, thereby increasing the matching score value. Diagnosing a stereo camera can be performed by determining this value.

An example of a method for determining the offset of an epipolar line from a matching score value is shown below.

(1) A minimal matching score value $M_i$ as to each pixel i of an image is calculated.
(2) The number of points $N_{over}$ to satisfy a standard score value $M_{th} < M_i$ is counted by comparing $M_{th}$ with $M_i$.
(3) Upon comparing a standard number $N_{th}$ with $N_{over}$, determination is made that the offset of an epipolar line is small in the event that $N_{over} < N_{th}$; on the other hand, determination is made that the offset is large in the event that $N_{th} < N_{over}$.

Figure 18:
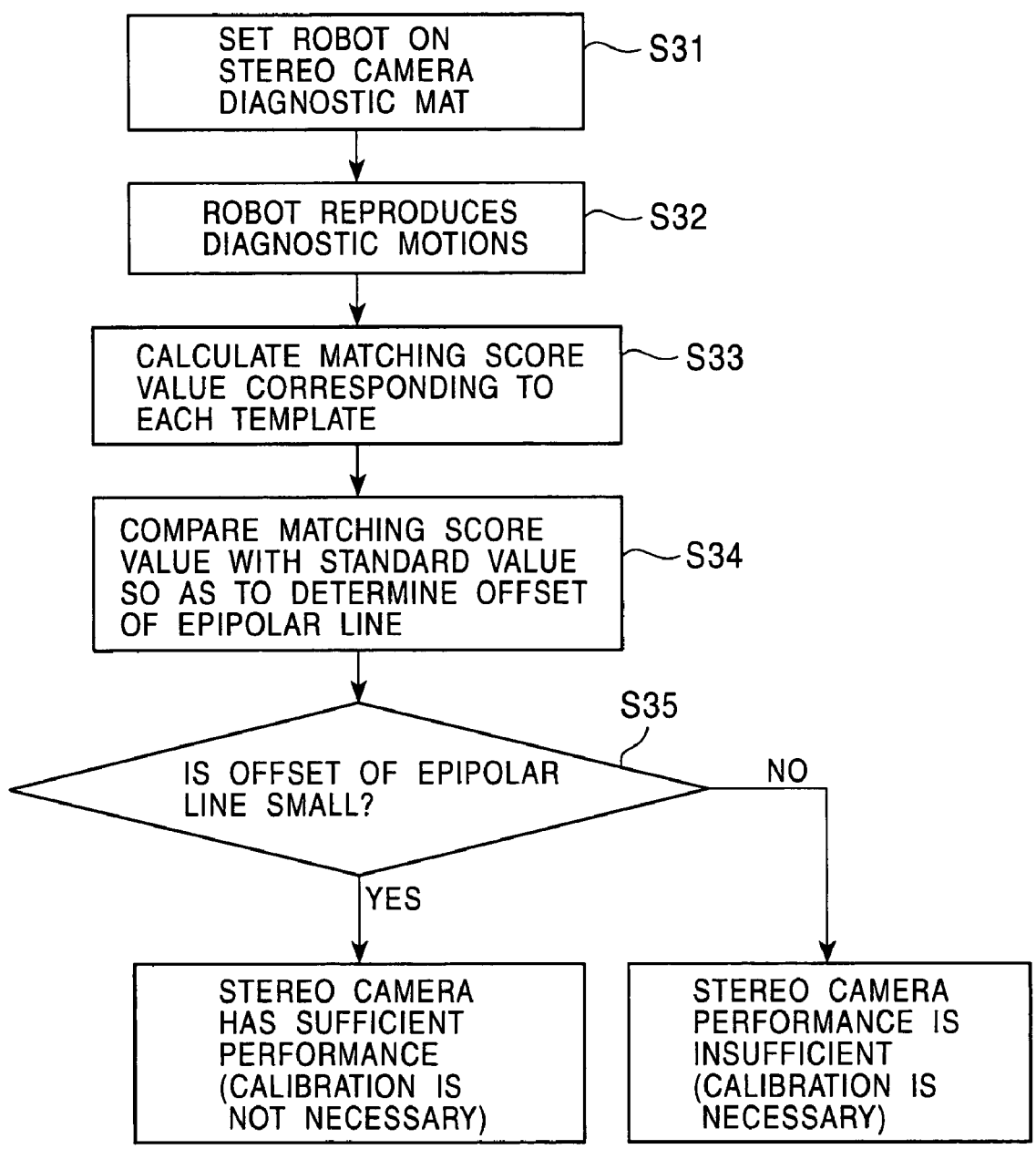
FIG. 18 is a flowchart illustrating the procedures for diagnosing the stereo camera based on matching score values.

FIG. 18 illustrates the procedures for diagnosing a stereo camera based on a matching score value in a flowchart format. The robot is placed on the diagnostic mat (Step S31), and then upon a predetermined command being input, the robot reproduces diagnostic motion (Step S32). The robot takes a stance suitable for taking a picture of the diagnostic mat by this motion.

The term "stance suitable for taking a picture of the diagnostic mat" here means a sufficient size to get data required for diagnosis and calibration, that is to say, a stance to take a picture of the calibration pattern on the mat in a size sufficient to cover the region to be calibrated of a camera image. Motion operations for searching for this suitable stance will be described later in detail.

Next, the matching score value corresponding to each template is calculated (Step S33), the calculated matching score value is compared with a standard value, and then the offset of the epipolar line is determined (Step S34).

Subsequently, determination is made whether or not the offset of the epipolar line is small (Step S35). In the event that the offset of the epipolar line is sufficiently small, the performance of the stereo camera 15 is assumed to be sufficient, so determination is made that calibration is unnecessary. On the other hand, in the event that the offset of the epipolar line is large, the performance of the stereo camera 15 is assumed to be insufficient, so determination is made that calibration is necessary.

B-5. Method for Obtaining Multiple Diagnostic Results by Reproducing Motion

Figure 19:
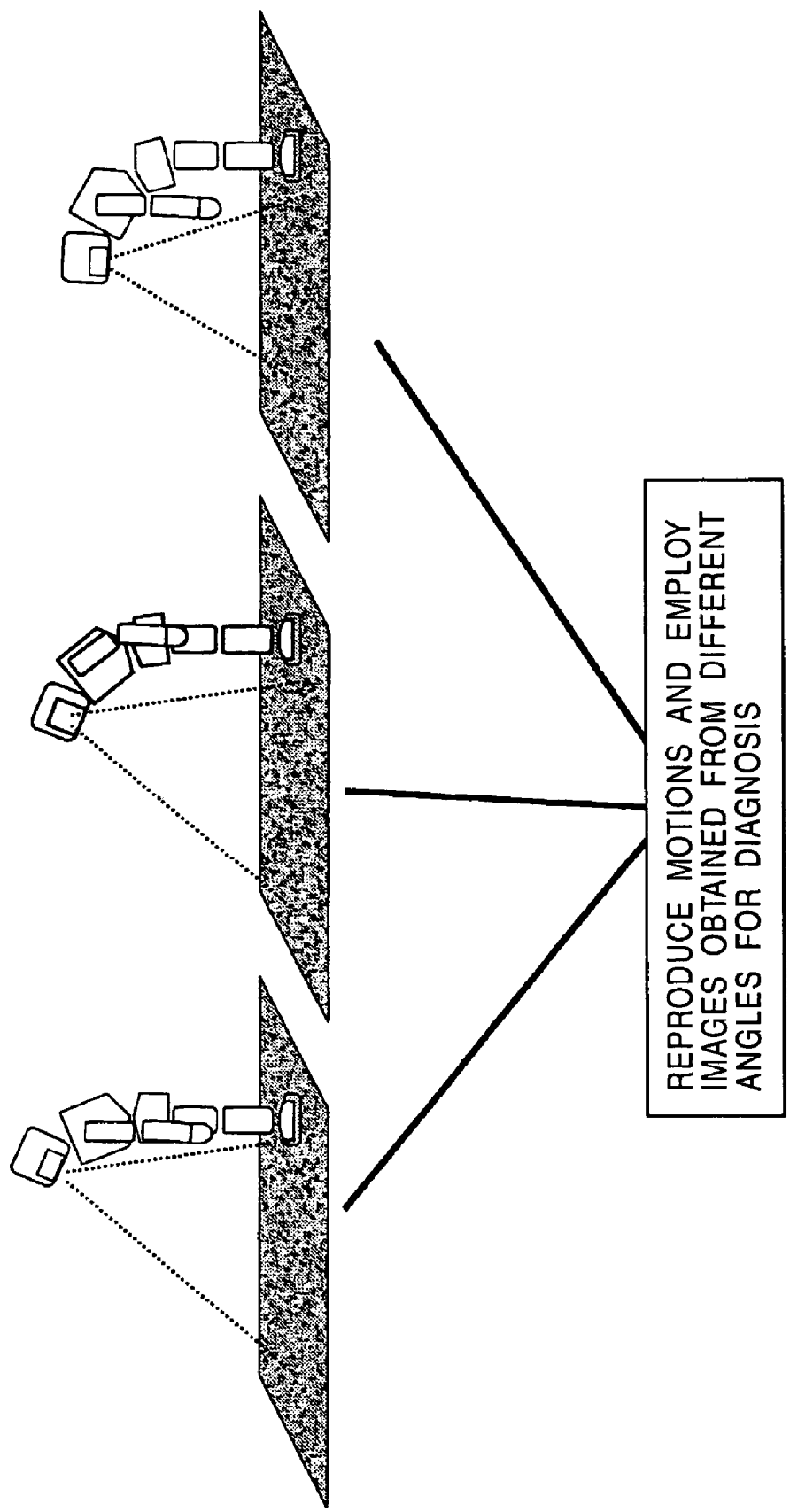
FIG. 19 is a diagram illustrating a method for acquiring multiple diagnostic results by reproducing motions.

Motion is reproduced on the diagnostic mat, and data acquired from multiple angles and distances is employed (see FIG. 19), thereby improving the diagnostic performance of stereo cameras.

B-6. Stance Suitable for Taking Picture of Diagnostic Mat

With the present embodiment, the robot apparatus mounting a stereo camera takes a picture of the diagnostic mat, thereby performing calibration of the camera.

Now, the term "stance suitable for taking a picture of the diagnostic mat" here means a sufficient size to get data required for diagnosis and calibration, that is to say, a stance to take a picture of the calibration pattern on the mat in a size sufficient to cover the region to be calibrated of the camera image.

The step for making the robot apparatus to assume a stance suitable for taking a picture of the diagnostic mat specifically comprises a step for searching for the visual line direction of the stereo camera such that texture fits in the region to be diagnosed within an image taken by the stereo camera; and a step for adjusting the size of the region to be diagnosed within the image taken by the stereo camera such that the texture covers the size in the visual line direction of the stereo camera.

In the step for searching for the visual line direction of the stereo camera, for example, the visual line direction can be detected through an action such as waggling the head mounting the stereo camera. Also, in the step for adjusting the size of the region to be diagnosed, the size can be adjusted through an action such as adjusting the distance up to the diagnostic mat using the mobile legs of the robot, or zooming.

Figure 24:
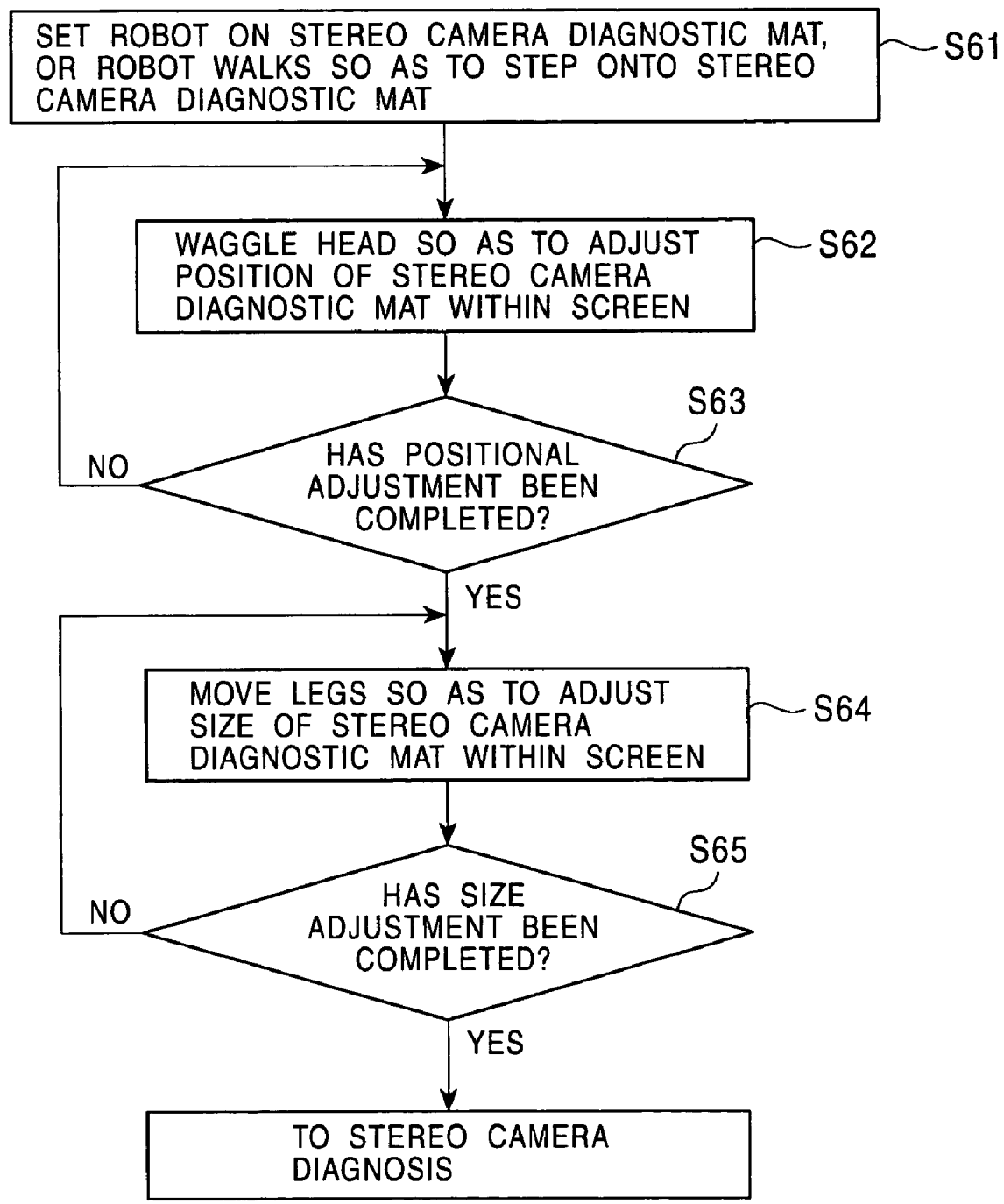
FIG. 24 is a flowchart illustrating action procedures for the robot apparatus to assume a stance suitable for taking image of the diagnostic mat.

FIG. 24 illustrates the procedures for making the robot apparatus to assume a stance suitable for taking a picture of the diagnostic mat in a flowchart format. Furthermore, FIG. 25 illustrates a stance of the robot apparatus at each step of the procedures, and images acquired by the stereo camera. The following description will be made regarding the procedures for making the robot apparatus to assume a stance suitable for taking a picture of the diagnostic mat with reference to each drawing.

First, the robot apparatus is placed on the stereo camera diagnostic mat (Step S61). Or, the robot apparatus may autonomously place itself on the stereo camera mat by ambulatory actions using its own mobile legs, that is to say, the robot may walk onto the mat by itself.

Next, the robot apparatus adjusts the position of the stereo camera diagnostic mat within a screen by an action of waggling the head thereof, for example (Step S62). This adjustment is repeated until the texture formed on the surface of the diagnostic mat fits a region to be diagnosed of an image taken by the stereo camera (see FIG. 25A) (Step S63).

Upon positional adjustment being completed, next, with the visual line direction secured, the legs are moved, whereby the size of the stereo camera diagnostic mat is adjusted within the taken image (Step S64). This adjustment is repeated until texture formed on the surface of the diagnostic mat covers the region to be diagnosed of the image taken by the stereo camera (see FIG. 25B) (Step S65)

Thus, upon a stance suitable for diagnosis being fixed, the above-described stereo camera diagnosis starts. Note that minimum required conditions include to secure the visual line direction where the texture formed on the surface of the diagnostic mat fits the region to be diagnosed with in the image taken by the stereo camera, and to take a picture of the texture in a size sufficient to cover the region to be diagnosed with in the image taken by the stereo camera in this visual line direction.

In addition to such minimum required conditions, as an additional condition required for improving the performance of diagnosis and calibration, the optic axis of the standard camera is disposed as close to 90° as to the diagnostic mat as possible.

That is to say, the closer the angle between the optic axis of the standard camera and the calibration mat is to 90°, the smaller the apparent difference between the texture of a right image and the texture of a left image due to binocular parallax is, and consequently, matching is correctly performed, thereby improving calibration accuracy. On the other hand, in a case of a narrow angle, the left and right images are affected by perspective distortion, so that the apparent difference of the texture expands, thereby leading to mismatching.

Although depending on a vertical view angle of the camera and the proportion (height, neck length, and the like) of the limbs of the bipedal ambulatory robot apparatus according to the present embodiment, setting the angle between the optic axis of the standard camera and the diagnostic mat to 90° brings the feet thereof into full sight, thereby reducing the area of the diagnostic mat to be viewed. On the other hand, in a case of a narrow angle, distant objects come into the field of view as well, so a large-sized calibration mat is needed to cover the entire area thereof, which should be taken into consideration.

C. Calibration Method of Stereo Camera

Measuring distances between multiple images taken by multiple cameras and a subject based on the stereo method is performed with the assumption that an imaging optical system possessed by the cameras completely matches the theoretical properties thereof. Accordingly, images acquired by taking a picture on the spot need to be subjected to predetermined compensation. For example, in general, the lens of a camera has distortion parameters, so observation points are formed at displaced position from theoretical points. Accordingly, parameters unique to each camera need to be calculated, and compensation of image data needs to be performed in accordance with these parameters at the time of projective conversion, otherwise, an accurate projected image cannot be obtained from a frontal image, and moreover, accurate depth measurement cannot be performed with the stereo method.

The parameters possessed by a camera are sectioned into internal parameters representing properties of the camera, external parameters indicating the three-dimensional position of the camera, as well as distortion parameters of the lens. The method for calculating these camera parameters is generally called "camera calibration".

Figure 20:
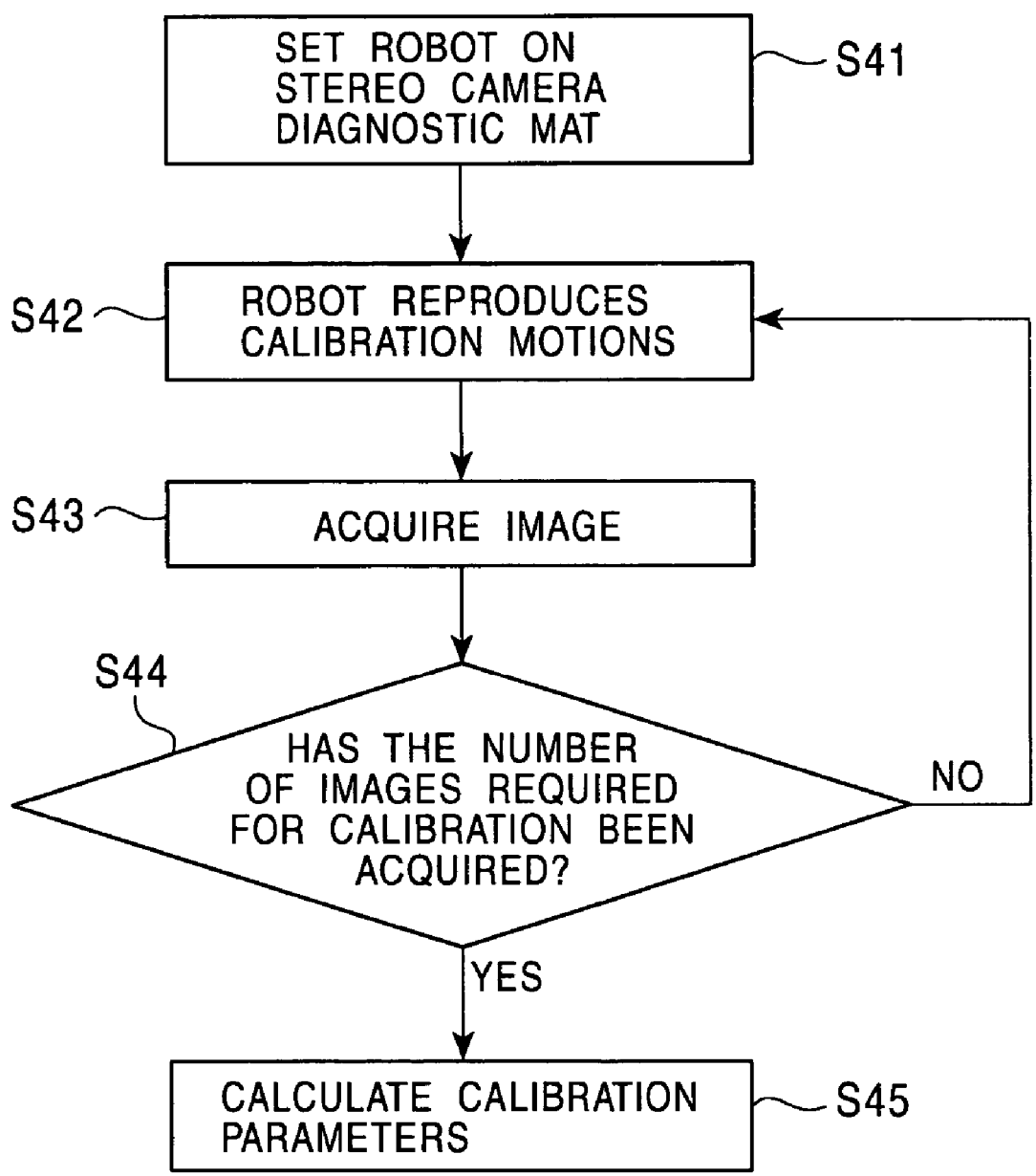
FIG. 20 is a flowchart illustrating the procedures of camera calibration using the diagnostic mat.

FIG. 20 illustrates the procedures for camera calibration using the diagnostic mat in a flowchart format. First, the robot is placed on the diagnostic mat (Step S41), and then upon a predetermined command being input, the robot reproduces calibration motions (Step S42). Next, in this state, an image is acquired from the stereo camera 15 (Step S43).

This processing is repeatedly performed until all images required for calibration are obtained (Step S44). In the event that images from different angles are required, motion capable of obtaining images from required angles is reproduced, although this depends on the calibration method.

Next, upon all images required for calibration being obtained, calibration parameters are calculated (Step S45).

Figure 21:
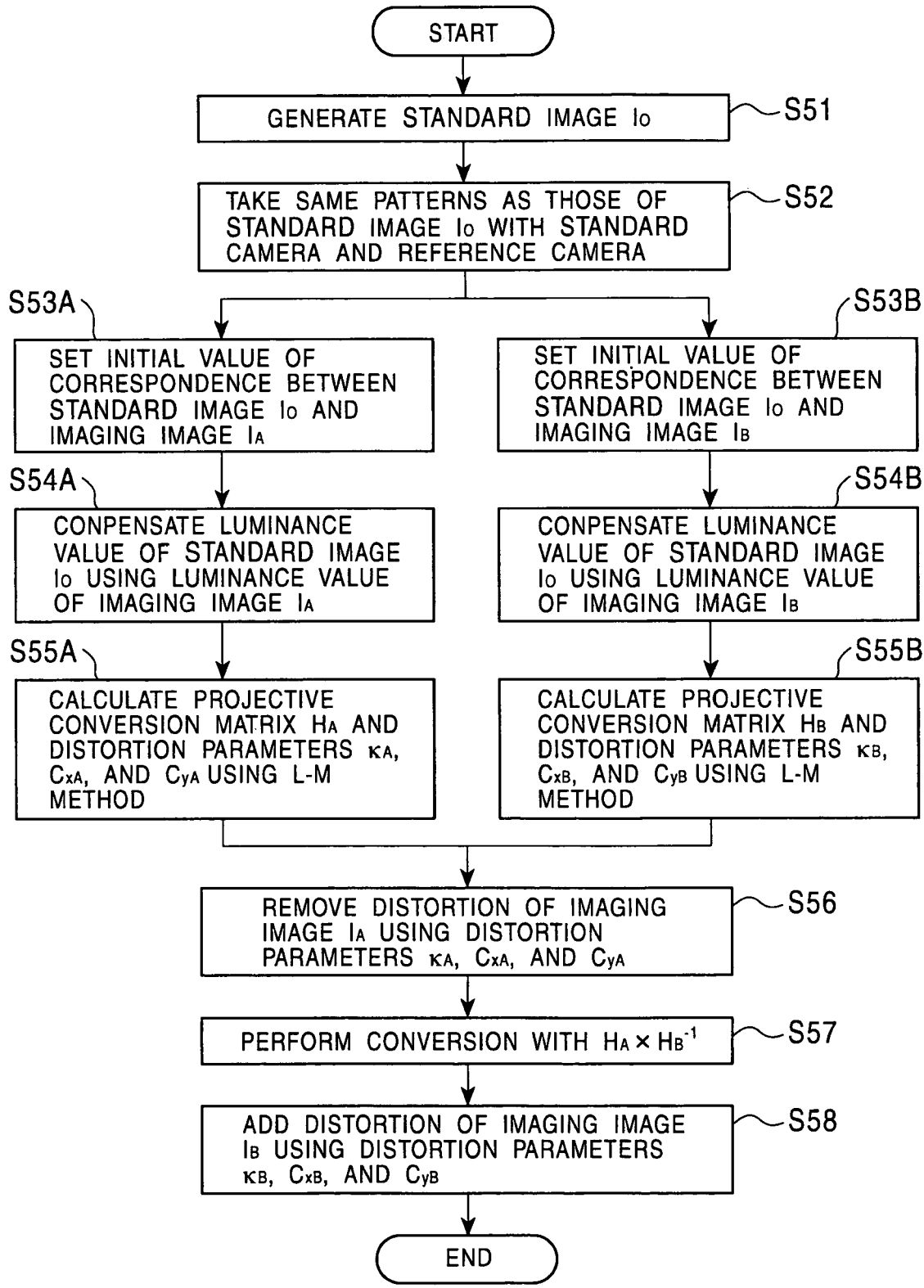
FIG. 21 is a flowchart illustrating an example of the calculation method of calibration parameters.

The following description will be made regarding an example of a calculation method for calibration parameters in Step S45 with reference to FIG. 21.

First, calibration patterns are synthesized based on the definition of a geometrical shape, and then this synthesized image is stored in frame memory as a standard image $I_o$ (Step S51).

Next, a diagnostic mat on which the calibration patterns are formed is taken by the standard camera and reference camera. Grayscale images $I_A$ and $I_B$ taken by each camera are temporarily stored to the frame memory (Step S52). The patterns formed on the diagnostic mat are calibration patterns used for calibration, of which geometrical shapes have the same definition as with a standard image $I_o$. The shape, size, and color of the calibration pattern is not restricted to any particular one as long as the geometrical shape is known, and accordingly, a combination of simple basic graphics which facilitates image synthesizing is sufficient, as described above. Here, a flat face having texture of a black-and-white checkerboard pattern as shown in FIG. 7 is employed as a calibration pattern. A distance from this flat face having the texture to each camera is not restricted to any particular distance.

Next, the initial value of the corresponding relation between the standard image $I_O$ and the taken image $I_A$ is set (Step S53A). This corresponding relation is described using projective conversion matrix $H_A$. However, at this time, lens distortion of the standard camera is not needed to be considered, all that needed here is to set correspondence between two images. For the initial value, a setting method is not restricted to any particular method as long as 4 or more corresponding points can be set.

Next, in order to perform image matching effectively with high precision, the luminance value of the standard image $I_O$ is compensated using the luminance value of the taken image $I_A$ (Step S54A).

Next, image registration is performed using the Levenberg-Marquardt minimization method, and a projective conversion matrix $H_A$ and distortion parameters $\kappa_A$, $C_{xA}$, and $C_{yA}$ are calculated (Step S55A), wherein $\kappa_A$ is a coefficient of lens distortion of the standard camera, and point $(C_{xA}, C_{yA})$ is the center of lens distortion.

Moreover, in the same way, the initial value of the corresponding relation between the taken image $I_B$ of the reference camera and the standard image $I_O$ is also set (Step S53B), the luminance value of the standard image $I_O$ using the luminance value of the taken image $I_B$ is compensated (Step S54B), and then a projective conversion matrix $H_B$ and distortion parameters $\kappa_B$, $C_{xB}$, and $C_{yB}$ are calculated (Step S55B).

A projective conversion matrix $H_{trans}$ from the taken image $I_A$ of the standard camera $I_A$ to the taken image $I_B$ of the reference camera $I_B$ can be represented as $H_A \times H_B^{-1}$ (Step S57). Prior to or following this projective conversion step, distortion of the taken image $I_A$ is removed using $\kappa_A$, $C_{xA}$, and $C_{yA}$ (Step S56), on the other hand, distortion equivalent to the taken image $I_B$ is added using the distortion parameters $\kappa_B$, $C_{xB}$, and $C_{yB}$ (Step S57).

Note that, at the time of performing image registration, corresponding image coordinates systems need to be matched (i.e., in the taken image $I_A$ of a camera 17A and the taken image $I_B$ of a camera 17B, the corresponding square needs to be subjected to registration as to the same square of the standard image $I_O$). Therefore, an arrangement may be made wherein a specific pattern is provided on one or more portions within the calibration pattern so as to perform matching between images.

The present invention has been described in detail with reference to specific embodiments, but it is fully apparent that one skilled in the art can make various modifications and substitutions to the embodiments without departing from the spirit and scope of the present invention.

It should be noted that the essence of the present invention is not necessarily restricted to a product referred to as a "robot". That is to say, the present invention may be applied to any product, even those belonging to other industrial fields, such as toys for example, as long as a mechanical apparatus or other common mobile equipment performs motion similar to human movement using electric or magnetic action. In other words, the present invention has been disclosed by way of embodiments as examples, so the embodiments should be interpreted illustratively and not restrictively, and the scope of the present invention should only be interpreted in light of the appended claims.

What is claimed is:

1. A diagnosing device for a stereo camera mounted on a robot, said device comprising:
    a flat surface portion on which texture for stereo camera diagnosis is provided;
    an attitude unit that causes said robot apparatus placed on said diagnostic mat to assume a stance suitable for obtaining an image of the diagnostic mat by searching for a visual line direction of the stereo camera such that the texture fits in the region to be diagnosed within an image obtained by the stereo camera; and adjusting the size of the region to be diagnosed within the image obtained by the stereo camera such that the texture covers the size in the visual line direction of the stereo camera;
    a creation unit adapted to create a distance image based on the image obtained by said stereo camera;
    an image detection unit adapted to detect the flat face of said diagnostic mat from said created distance image; and
    a measurement unit adapted to measure the flatness of said detected flat face, and verifying the performance of a stereo camera according to whether or not the flatness is greater than a standard flatness,
    wherein when the measured flatness of the detected flat face meets at least the standard flatness, performance of the diagnosing device is determined to be sufficient and a determination is made that a calibration is unnecessary, and
    wherein when the measured flatness of the detected flat face is below the standard flatness, performance of the diagnosing device is determined to be insufficient and a determination is made that a calibration is necessary,
    wherein said robot includes a ground-contact portion for contact with a floor face, and
    wherein an indicator indicates a place on said surface portion where said ground-contact portion of said robot is placed.

2. A stereo camera diagnosing device according to claim 1, wherein said robot includes one or more mobile legs including a foot; and
    wherein said indicator indicates a place on said surface portion where the soles of feet of said robot are placed.

3. A stereo camera diagnosing device according to claim 1, wherein said stereo camera diagnosing device has a folding structure, which becomes a flat shape exposing said surface portion at the time of unfolding said folding structure.

4. A stereo camera diagnosing device according to claim 1, wherein said surface portion includes texture within a template, which can correctly perform matching on an epipolar line in the event of a stereo camera system using template matching.

5. A stereo camera diagnosing device according to claim 1, wherein said surface portion includes texture which allows avoiding mismatching in diagnosis and calibration.

6. A stereo camera diagnosing device according to claim 1, wherein said surface portion has patterns shaded in uniform texture.

7. A stereo camera diagnosing device according to claim 1, wherein said surface portion includes calibration patterns of which geometrical shape is known.

* * * * *